United States Patent
Bao et al.

(10) Patent No.: US 11,700,507 B2
(45) Date of Patent: Jul. 11, 2023

(54) REQUEST FOR ON-DEMAND POSITIONING REFERENCE SIGNAL POSITIONING SESSION AT A FUTURE TIME

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/820,526

(22) Filed: Aug. 17, 2022

(65) Prior Publication Data
US 2023/0036092 A1 Feb. 2, 2023

Related U.S. Application Data

(63) Continuation of application No. 17/390,182, filed on Jul. 30, 2021, now Pat. No. 11,445,334.

(51) Int. Cl.
*H04W 4/029* (2018.01)
*H04L 5/00* (2006.01)

(52) U.S. Cl.
CPC ........... *H04W 4/029* (2018.02); *H04L 5/0048* (2013.01)

(58) Field of Classification Search
CPC .............................. H04W 4/029; H04L 5/0048
See application file for complete search history.

(56) References Cited

U.S. PATENT DOCUMENTS

| 11,445,334 B1 | 9/2022 | Bao |
| 2019/0074946 A1 | 3/2019 | Xue et al. |
| 2020/0028648 A1 | 1/2020 | Akkarakaran et al. |
| 2021/0329417 A1* | 10/2021 | Priyanto .............. H04B 7/0617 |

OTHER PUBLICATIONS

International Search Report and Written Opinion—PCT/US2022/072677—ISA/EPO—dated Oct. 10, 2022.
Qualcomm Incorporated: "On-Demand PRS", 3GPP Draft, 3GPP TSG-RAN WG2 Meeting #112-e, R2-2010097, 3rd Generation Partnership Project (3GPP), Mobile Competence Centre, 650, Route Des Lucioles, F-06921 Sophia-Antipolis Cedex, France, vol. RAN WG2, No. Electronic, Nov. 2, 2020-Nov. 13, 2020, Oct. 23, 2020 (Oct. 23, 2020), XP051942802, 12 Pages.
Spreadtrum Communications: "Discussion on the Enhancements of on-Demand PRS", 3GPP TSG-RAN WG2 Meeting #113bis-e, R2-2103250, 3rd Generation Partnership Project (3GPP), Mobile Competence Centre, 650, Route Des Lucioles, F-06921 Sophia-Antipolis Cedex, France, vol. RAN WG2, No. Online, Apr. 12, 2021-Apr. 20, 2021, Apr. 2, 2021 (Apr. 2, 2021), XP052174848, 2 Pages.

* cited by examiner

*Primary Examiner* — Kabir A Timory
(74) *Attorney, Agent, or Firm* — Qualcomm Incorporated

(57) ABSTRACT

Disclosed are techniques for wireless communication. In an aspect, a position determination entity (PDE) receives a request to schedule an on-demand PRS positioning session of a UE at a future time, wherein the request is configured to request a first set of parameters for the scheduled on-demand PRS positioning session, with an availability of one or more parameters of the first set of parameters at the future time being indeterminable when the request is received. PDE determines the availability of the one or more parameters at the future time. PDE determines a PRS configuration for the scheduled on-demand PRS positioning session in advance of the future time.

68 Claims, 18 Drawing Sheets

REQUEST FOR ON-DEMAND POSITIONING REFERENCE SIGNAL POSITIONING SESSION AT A FUTURE TIME

CROSS-REFERENCE TO RELATED APPLICATIONS

The present application for patent is a Continuation of U.S. patent application Ser. No. 17/390,182, entitled "REQUEST FOR ON-DEMAND POSITIONING REFERENCE SIGNAL POSITIONING SESSION AT A FUTURE TIME," filed Jul. 30, 2021, which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a user equipment (UE) includes transmitting, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receiving, in response to the request and in advance of the future time, a PRS configuration for the scheduled on-demand PRS positioning session, wherein the PRS configuration includes a second set of parameters that is based at least in part on the availability of the one or more parameters at the future time.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is received via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a method of operating a position estimation entity includes receiving a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determining, in response to the request and in advance of the future time, the availability of the one or more parameters at the future time; determining a PRS configuration for the scheduled on-demand PRS positioning session, wherein the PRS configuration includes a second set of parameters that is based at least in part on the determination of the availability of the one or more parameters at the future time; and transmitting, in response to the request and in advance of the future time, the PRS configuration to the UE.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is transmitted via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a user equipment (UE) includes a memory; at least one transceiver; and at least one processor communicatively coupled to the memory and the at least one transceiver, the at least one processor configured to: transmit, via the at least one transceiver, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receive, via the at least one transceiver, in response to the request and in advance of the future time, a PRS configuration for the scheduled on-demand PRS positioning session, wherein the PRS configuration includes a second set of parameters that is based at least in part on the availability of the one or more parameters at the future time.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is received via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a position estimation entity includes a memory; at least one transceiver; and at least one processor communicatively coupled to the memory and the at least one transceiver, the at least one processor configured to: receive, via the at least one transceiver, a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determine, in response to the request and in advance of the future time, the availability of the one or more parameters at the future time; determine a PRS configuration for the scheduled on-demand PRS positioning session, wherein the PRS configuration includes a second set of parameters that is based at least in part on the determination of the availability of the one or more parameters at the future time; and transmit, via the at least one transceiver, in response to the request and in advance of the future time, the PRS configuration to the UE.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is transmitted via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a user equipment (UE) includes means for transmitting, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and means for receiving, in response to the request and in advance of the future time, a PRS configuration for the scheduled on-demand PRS positioning session, wherein the PRS configuration includes a second set of parameters that is based at least in part on the availability of the one or more parameters at the future time.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is received via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a position estimation entity includes means for receiving a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; means for determining, in response to the request and in advance of the future time, the availability of the one or more parameters at the future time; means for determining a PRS configuration for the scheduled on-demand PRS positioning session, wherein the PRS configuration includes a second set of parameters that is based at least in part on the determination of the availability of the one or more parameters at the future time; and means for transmitting, in response to the request and in advance of the future time, the PRS configuration to the UE.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is transmitted via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a non-transitory computer-readable medium storing computer-executable instructions that, when executed by a user equipment (UE), cause the UE to: transmit, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receive, in response to the request and in advance of the future time, a PRS configuration for the scheduled on-demand PRS positioning session, wherein the PRS configuration includes a second set of parameters that is based at least in part on the availability of the one or more parameters at the future time.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is received via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

In an aspect, a non-transitory computer-readable medium storing computer-executable instructions that, when executed by a position estimation entity, cause the position estimation entity to: receive a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determine, in response to the request and in advance of the future time, the availability of the one or more parameters at the future time; determine a PRS configuration for the scheduled on-demand PRS positioning session, wherein the PRS configuration includes a second set of parameters that is based at least in part on the determination of the availability of the one or more parameters at the future time; and transmit, in response to the request and in advance of the future time, the PRS configuration to the UE.

In some aspects, the PRS configuration comprises a downlink (DL) PRS configuration, an uplink (UL) PRS configuration, a sidelink (SL) PRS configuration, or a combination thereof.

In some aspects, the request designates whether a respective parameter is mandatory or optional for each parameter in the first set of parameters.

In some aspects, the first set of parameters includes at least one sidelink (SL) anchor.

In some aspects, the first set of parameters includes, for the at least one SL anchor, an SL beam direction, an SL bandwidth or bandwidth part (BWP), a synchronization signal block (SSB) configuration, or a combination thereof.

In some aspects, the one or more parameters that are indeterminable when the request is transmitted are associated with the at least one SL anchor due to mobility of the at least one SL anchor.

In some aspects, one or more other parameters for at least one stationary anchor are determinable when the request is transmitted due to lack of mobility of the least one stationary anchor.

In some aspects, the request specifies the future time via indication of a preferred start time and duration.

In some aspects, the preferred start time and duration are specified via a set of slots, sub-frames or frames, or the preferred start time and duration are specified in absolute time, or wherein the preferred start time and duration is specified via reference to a future measurement gap or PRS occasion of a current PRS configuration.

In some aspects, at least one parameter in the first set of parameters is associated with at least one time constraint.

In some aspects, the at least one time constraint limits when the at least one parameter can be requested, modified, or removed from association with the scheduled on-demand PRS positioning session.

In some aspects, the PRS configuration is required to be received within a designated time window.

In some aspects, the PRS configuration is transmitted via a plurality of partial PRS configurations that cumulatively define each of the first set of parameters for the scheduled on-demand PRS positioning session.

In some aspects, one or more requests for the PRS configuration and one or more responses carrying the PRS configuration include an identifier that is configured to distinguish the scheduled on-demand PRS positioning session from one or more other scheduled on-demand PRS positioning sessions.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
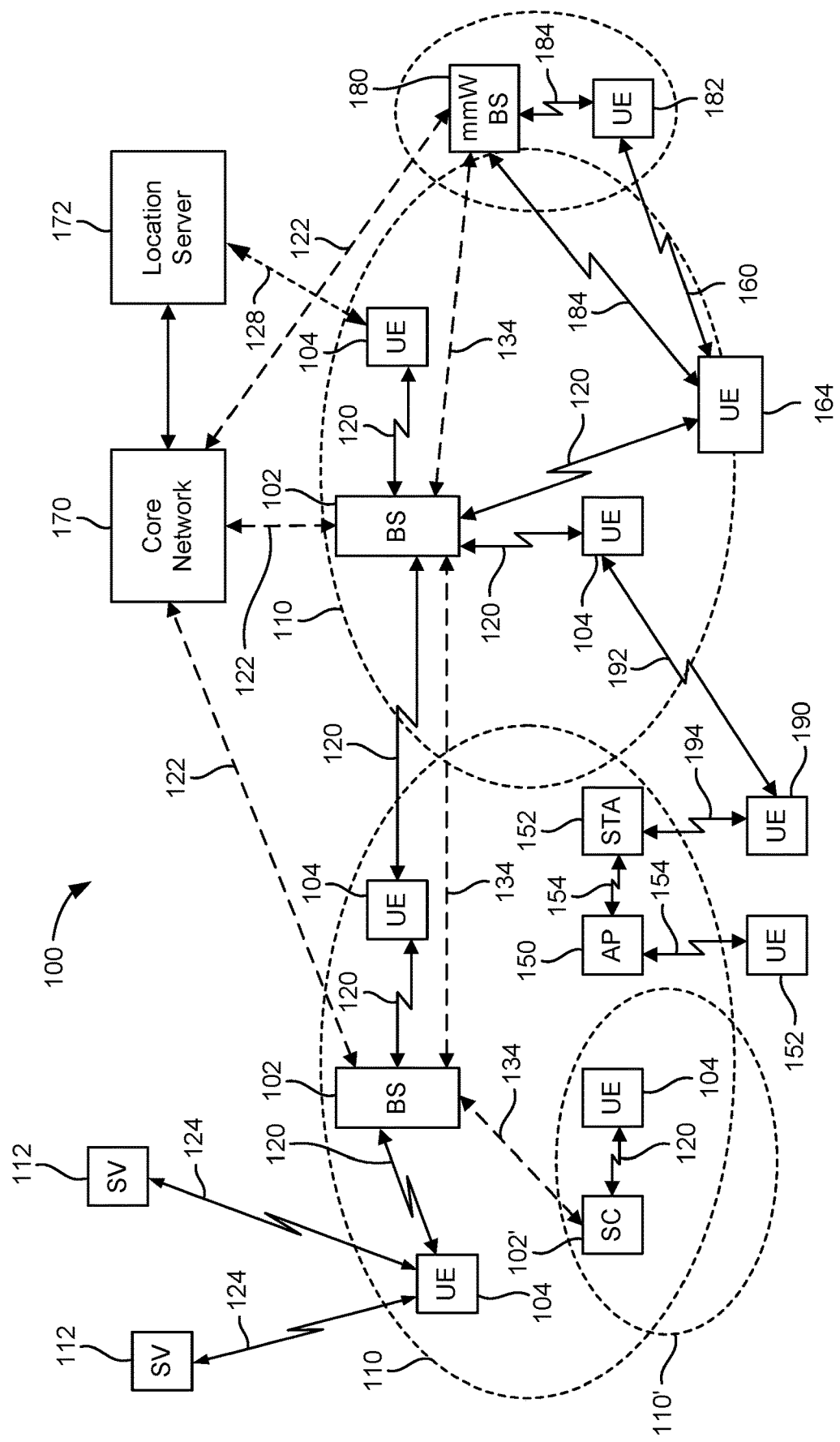
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
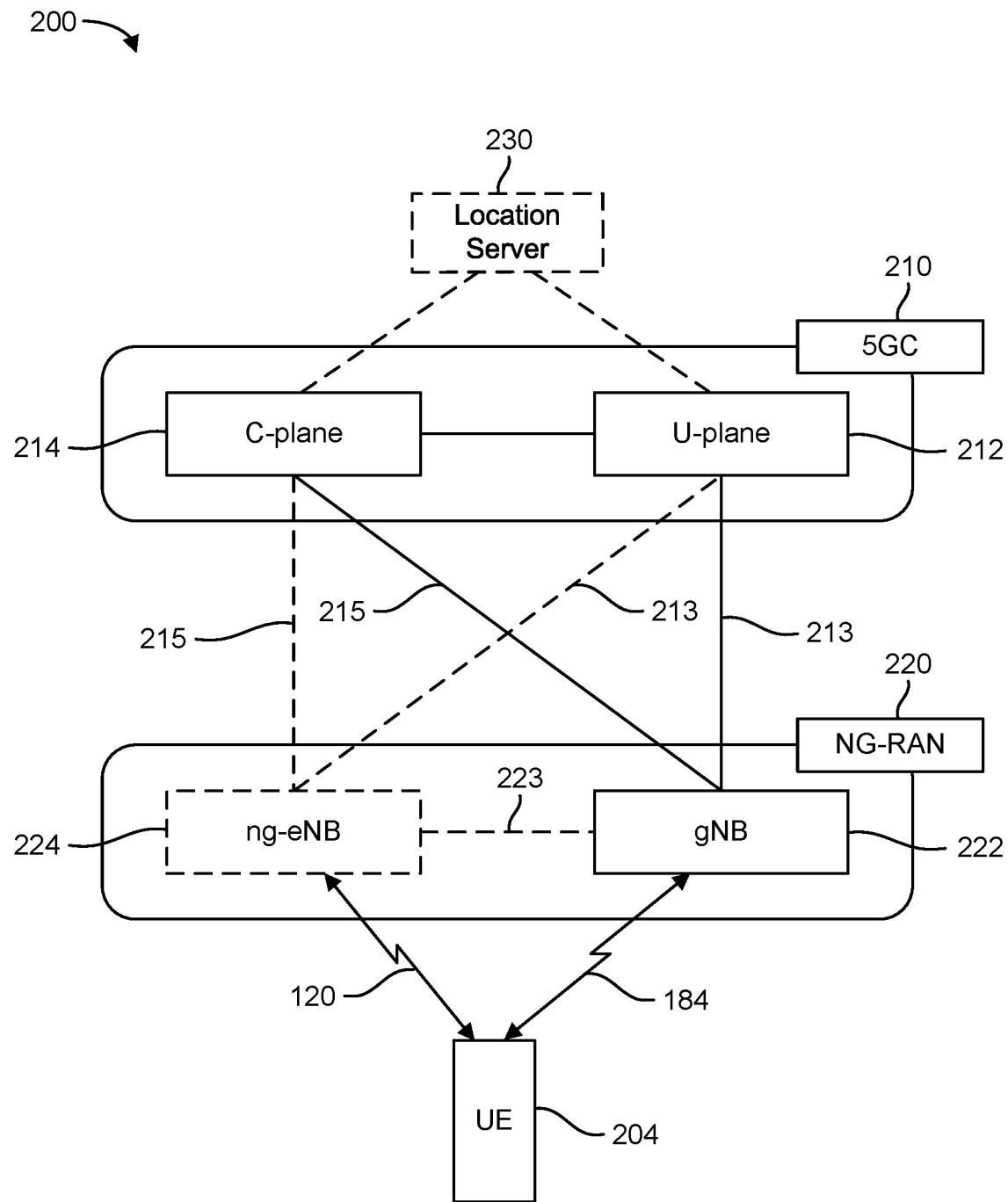
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
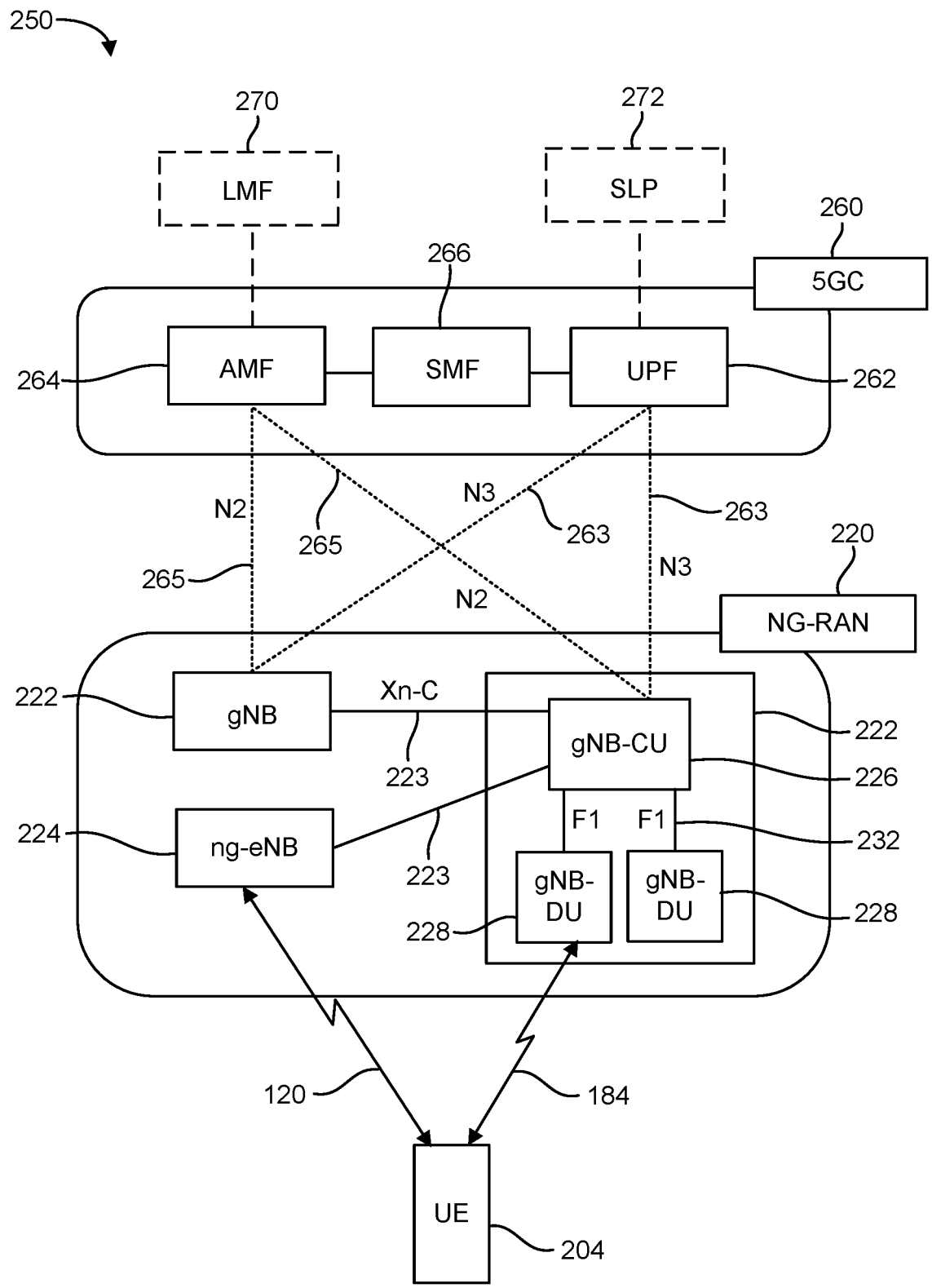

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F 1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
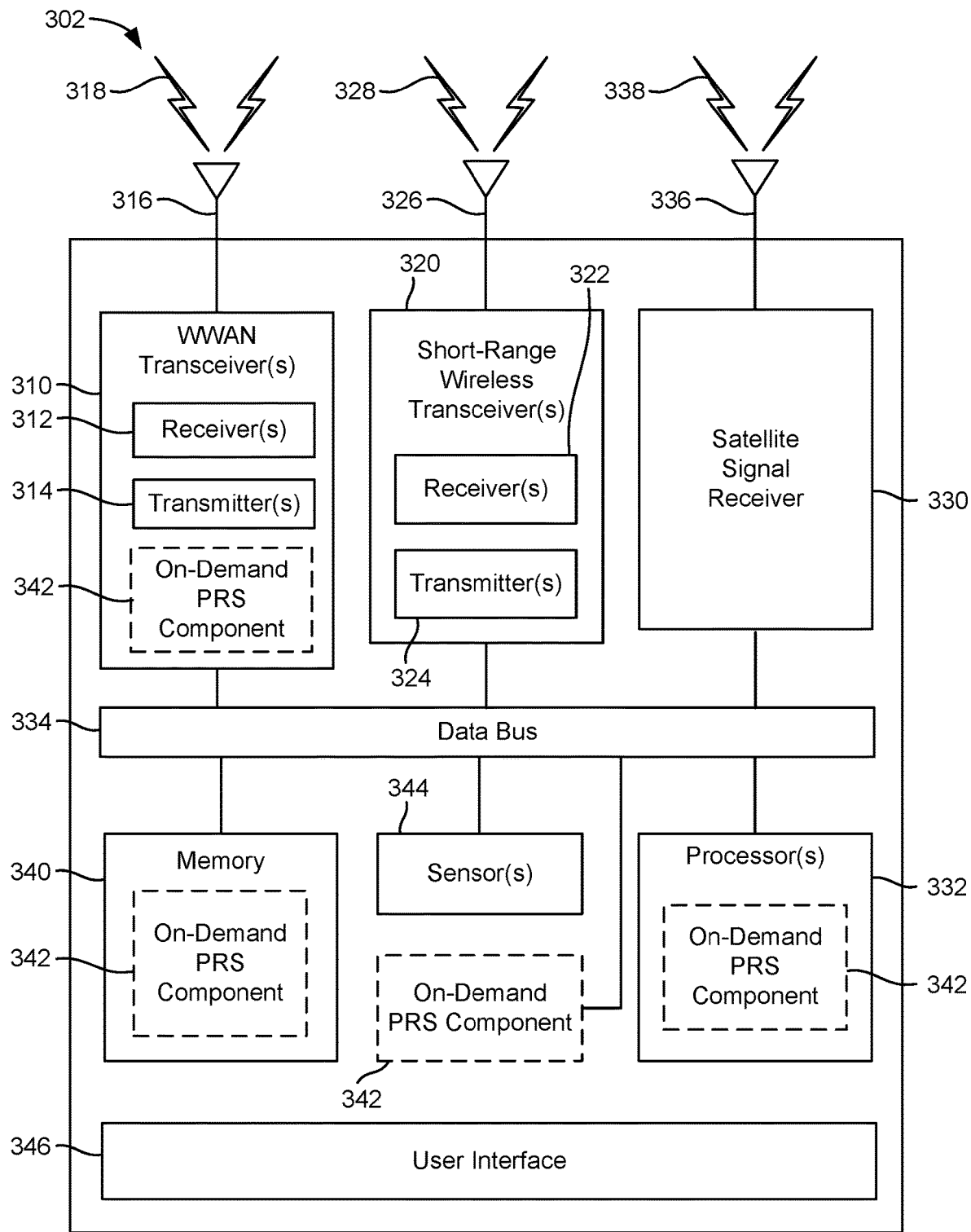
FIGS. 3A, 3B, and 3C are simplified block diagrams of several sample aspects of components that may be employed in a user equipment (UE), a base station, and a network entity, respectively, and configured to support communications as taught herein.
Figure 3B:
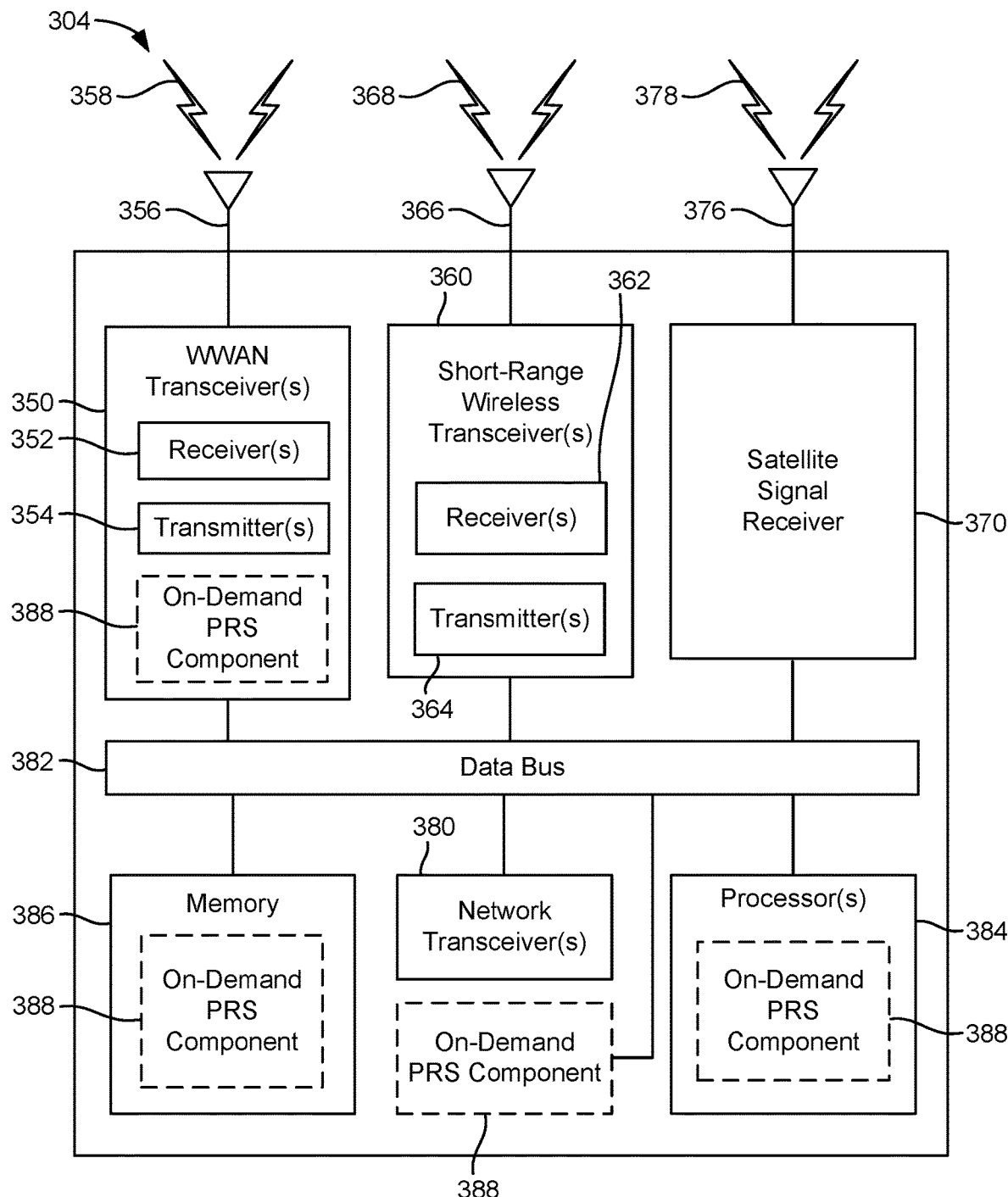
Figure 3C:
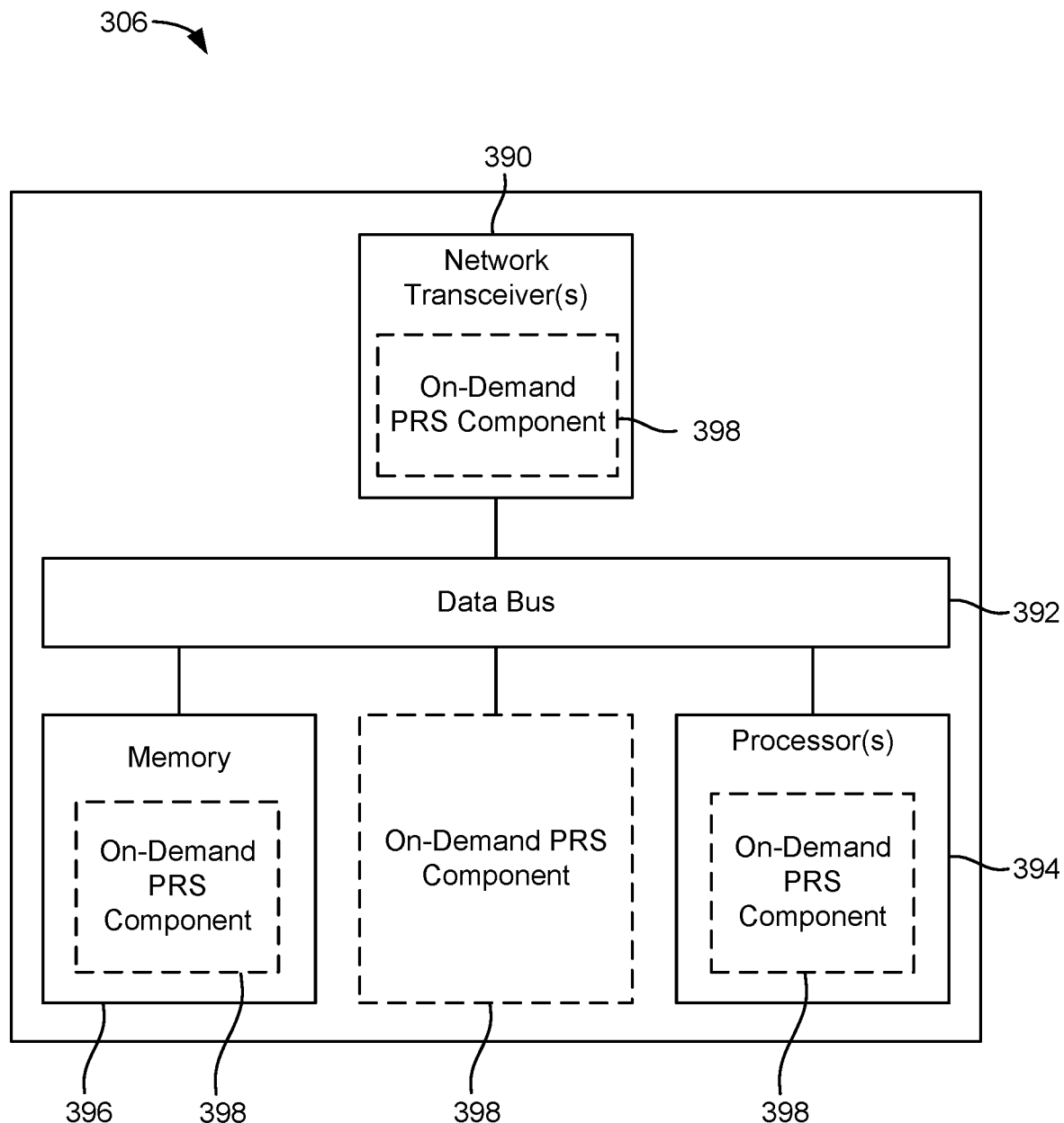

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include On-Demand PRS Component 342, 388, and 398, respectively. The On-Demand PRS Component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the On-Demand PRS Component 342, 388, and 398 may be external to the processors 332, 384, and 394 (e.g., part of a modem processing system, integrated with another processing system, etc.). Alternatively, the On-Demand PRS Component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein.

FIG. 3A illustrates possible locations of the On-Demand PRS Component 342, which may be, for example, part of the one or more WWAN transceivers 310, the memory 340, the one or more processors 332, or any combination thereof, or may be a standalone component. FIG. 3B illustrates possible locations of the On-Demand PRS Component 388, which may be, for example, part of the one or more WWAN transceivers 350, the memory 386, the one or more processors 384, or any combination thereof, or may be a standalone component. FIG. 3C illustrates possible locations of the On-Demand PRS Component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the On-Demand PRS Component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Figure 4:
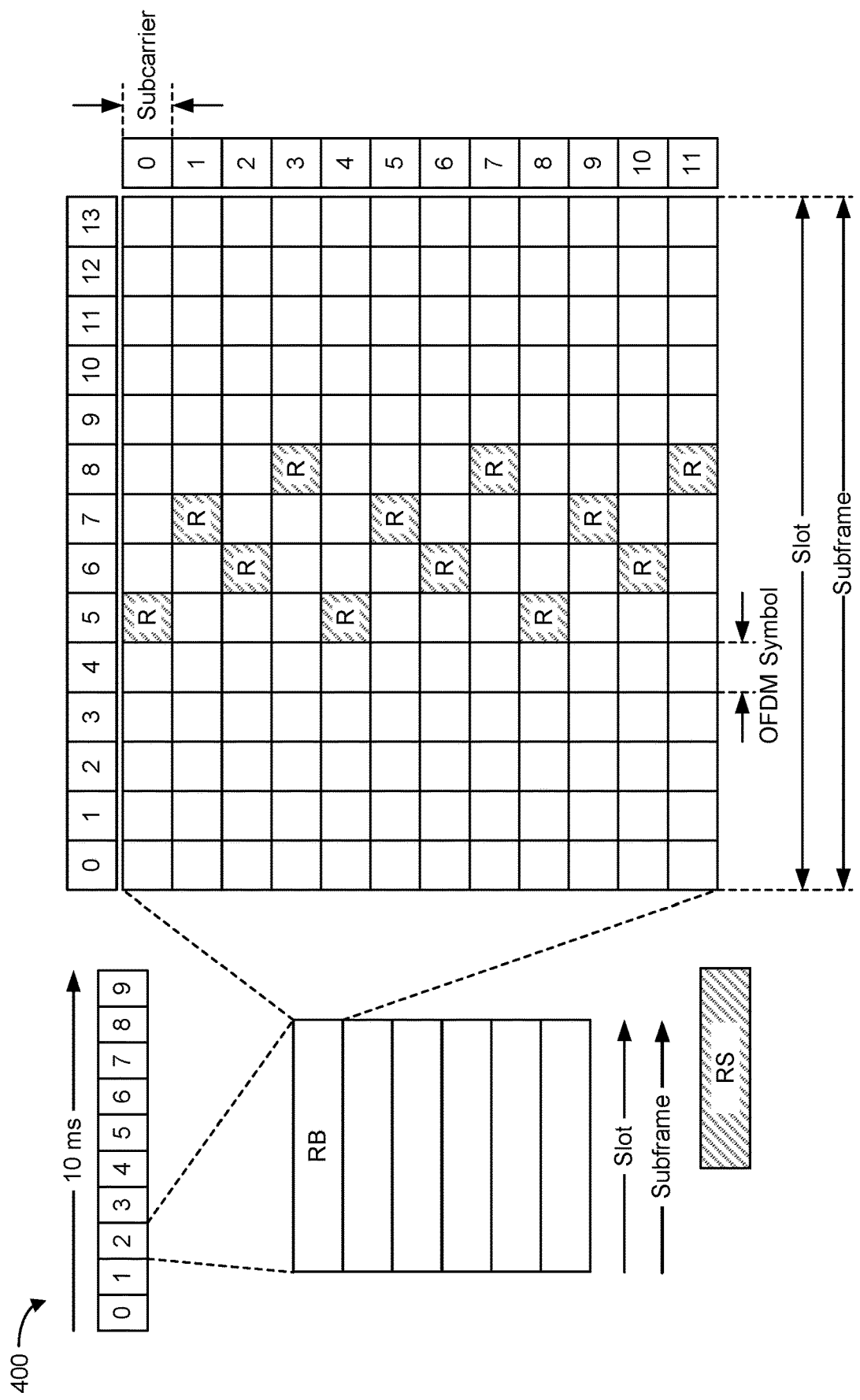
FIG. 4 is a diagram illustrating an example frame structure, according to aspects of the disclosure.

Various frame structures may be used to support downlink and uplink transmissions between network nodes (e.g., base stations and UEs). FIG. 4 is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacings of 15 kHz (μ=0), 30 kHz (μ=1), 60 kHz (μ=2), 120 kHz (μ=3), and 240 kHz (μ=4) or greater may be available. In each subcarrier spacing, there are 14 symbols per slot. For 15 kHz SCS (μ=0), there is one slot per subframe, 10 slots per frame, the slot duration is 1 millisecond (ms), the symbol duration is 66.7 microseconds (μs), and the maximum nominal system bandwidth (in MHz) with a 4K FFT size is 50. For 30 kHz SCS (μ=1), there are two slots per subframe, 20 slots per frame, the slot duration is 0.5 ms, the symbol duration is 33.3 μs, and the maximum nominal system bandwidth (in MHz) with a 4K FFT size is 100. For 60 kHz SCS (μ=2), there are four slots per subframe, 40 slots per frame, the slot duration is 0.25 ms, the symbol duration is 16.7 μs, and the maximum nominal system bandwidth (in MHz) with a 4K FFT size is 200. For 120 kHz SCS (μ=3), there are eight slots per subframe, 80 slots per frame, the slot duration is 0.125 ms, the symbol duration is 8.33 μs, and the maximum nominal system bandwidth (in MHz) with a 4K FFT size is 400. For 240 kHz SCS (μ=4), there are 16 slots per subframe, 160 slots per frame, the slot duration is 0.0625 ms, the symbol duration is 4.17 μs, and the maximum nominal system bandwidth (in MHz) with a 4K FFT size is 800.

In the example of FIG. 4, a numerology of 15 kHz is used. Thus, in the time domain, a 10 ms frame is divided into 10 equally sized subframes of 1 ms each, and each subframe includes one time slot. In FIG. 4, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4 illustrates example locations of REs carrying a reference signal (labeled "R").

Figure 5:
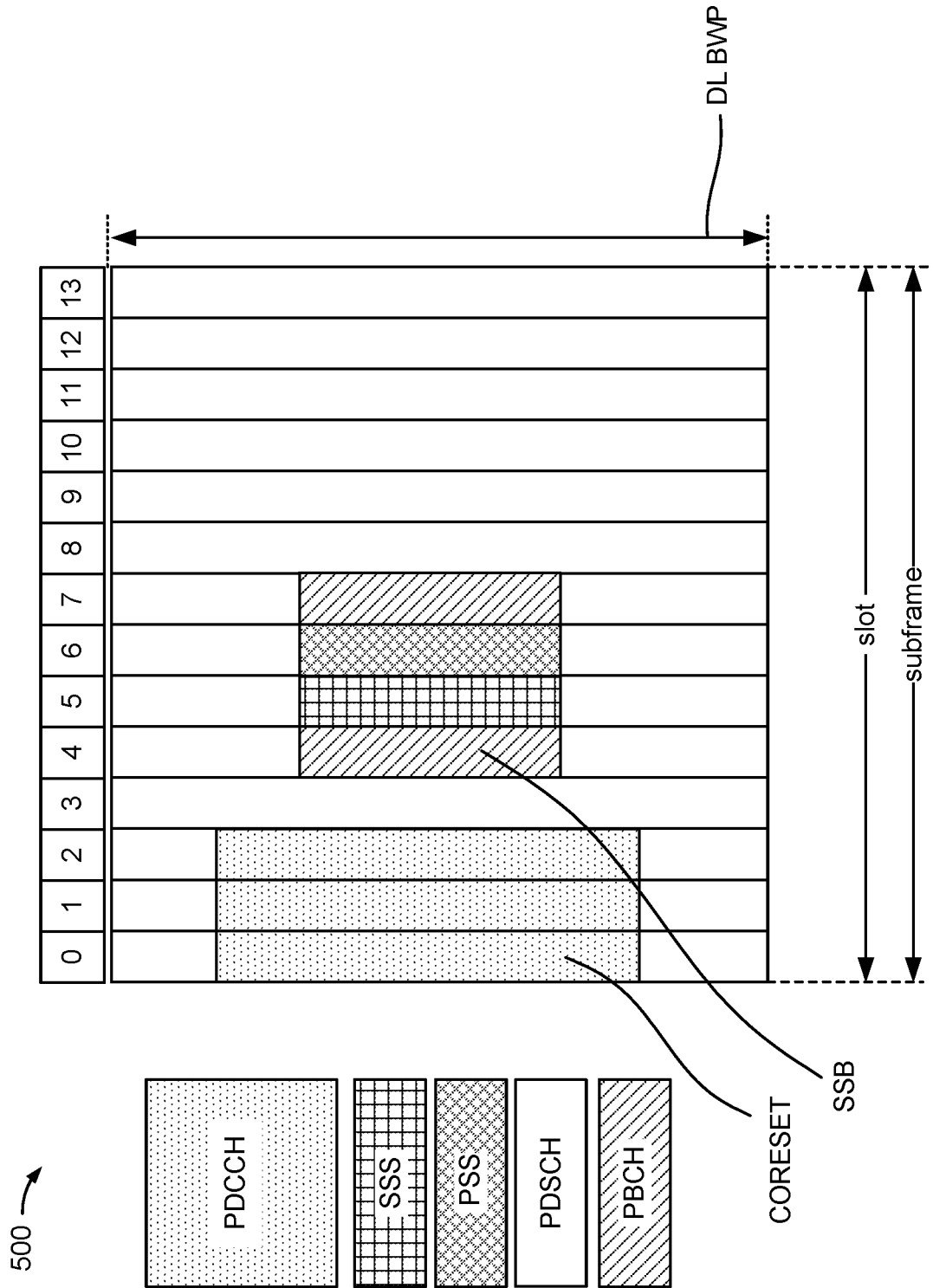
FIG. 5 is a diagram illustrating various downlink channels within an example downlink slot, according to aspects of the disclosure.

FIG. 5 is a diagram 500 illustrating various downlink channels within an example downlink slot. In FIG. 5, time is represented horizontally (on the X axis) with time increasing from left to right, while frequency is represented vertically (on the Y axis) with frequency increasing (or decreasing) from bottom to top. In the example of FIG. 5, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 5, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 5, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 5 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

Figure 6:
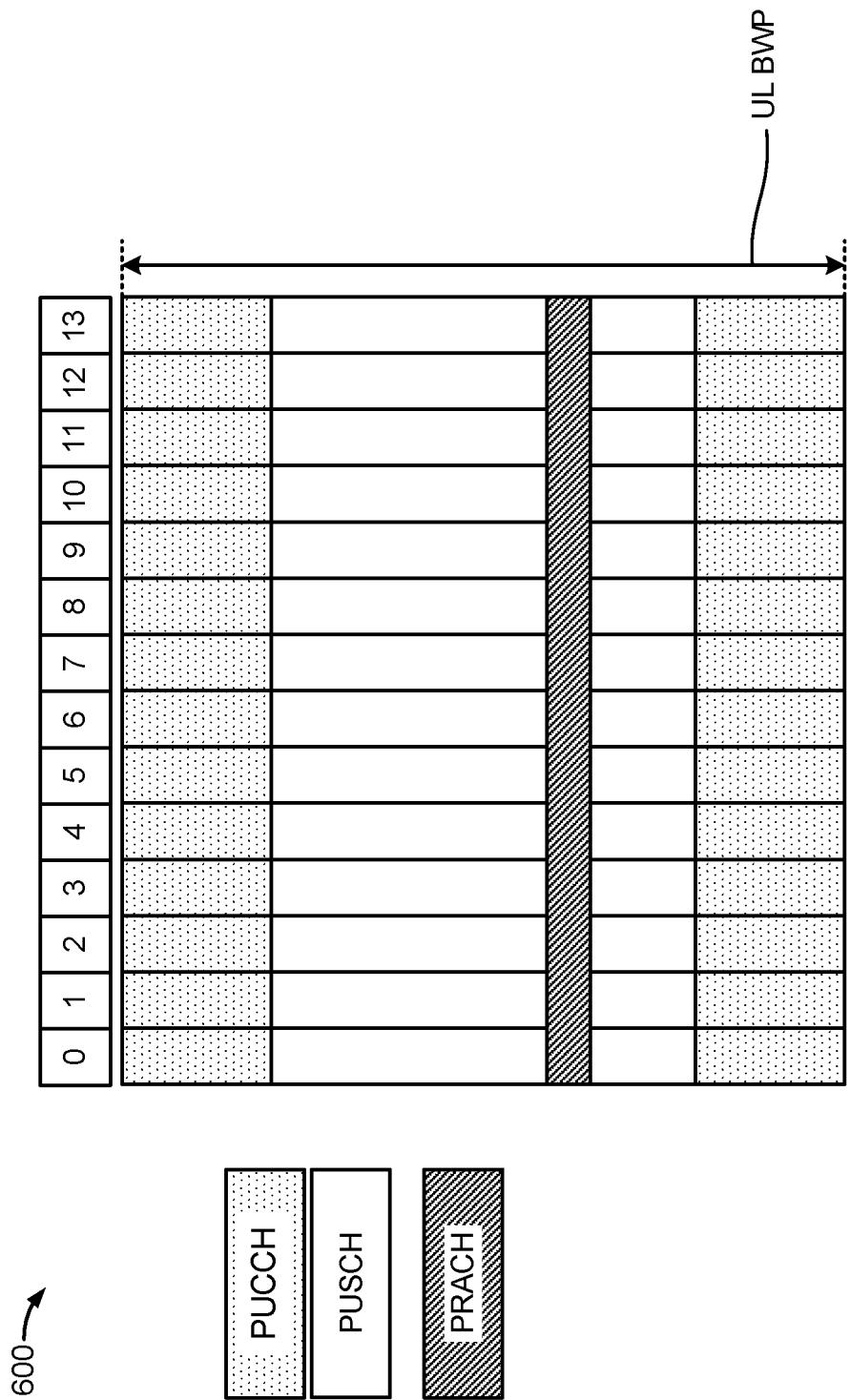
FIG. 6 is a diagram illustrating various uplink channels within an example uplink slot, according to aspects of the disclosure.

FIG. 6 is a diagram 600 illustrating various uplink channels within an example uplink slot. In FIG. 6, time is represented horizontally (on the X axis) with time increasing from left to right, while frequency is represented vertically (on the Y axis) with frequency increasing (or decreasing) from bottom to top. In the example of FIG. 6, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Figure 7:
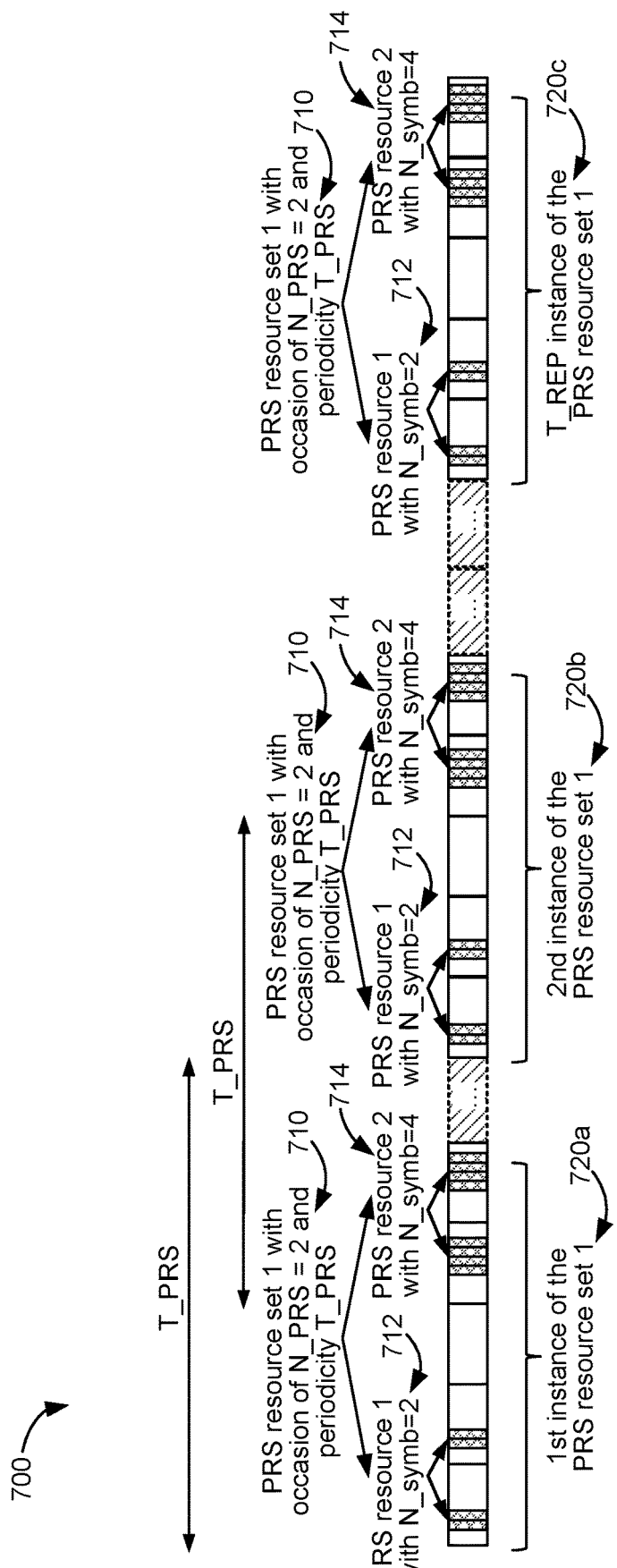
FIG. 7 is a diagram of an example positioning reference signal (PRS) configuration for the PRS transmissions of a given base station, according to aspects of the disclosure.

FIG. 7 is a diagram of an example PRS configuration 700 for the PRS transmissions of a given base station, according to aspects of the disclosure. In FIG. 7, time is represented horizontally, increasing from left to right. Each long rectangle represents a slot and each short (shaded) rectangle represents an OFDM symbol. In the example of FIG. 7, a PRS resource set 710 (labeled "PRS resource set 1") includes two PRS resources, a first PRS resource 712 (labeled "PRS resource 1") and a second PRS resource 514 (labeled "PRS resource 2"). The base station transmits PRS on the PRS resources 712 and 714 of the PRS resource set 710.

The PRS resource set 710 has an occasion length (N_PRS) of two slots and a periodicity (T_PRS) of, for example, 160 slots or 160 milliseconds (ms) (for 15 kHz subcarrier spacing). As such, both the PRS resources 712 and 714 are two consecutive slots in length and repeat every T_PRS slots, starting from the slot in which the first symbol of the respective PRS resource occurs. In the example of FIG. 7, the PRS resource 712 has a symbol length (N_symb) of two symbols, and the PRS resource 714 has a symbol length (N_symb) of four symbols. The PRS resource 712 and the PRS resource 714 may be transmitted on separate beams of the same base station.

Each instance of the PRS resource set 710, illustrated as instances 720a, 720b, and 720c, includes an occasion of length '2' (i.e., N_PRS=2) for each PRS resource 712, 714 of the PRS resource set. The PRS resources 712 and 714 are repeated every T_PRS slots up to the muting sequence periodicity T_REP. As such, a bitmap of length T_REP would be needed to indicate which occasions of instances 720a, 720b, and 720c of PRS resource set 710 are muted (i.e., not transmitted).

In an aspect, there may be additional constraints on the PRS configuration 700. For example, for all PRS resources (e.g., PRS resources 712, 714) of a PRS resource set (e.g., PRS resource set 710), the base station can configure the following parameters to be the same: (a) the occasion length (N_PRS), (b) the number of symbols (N_symb), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Figure 8:
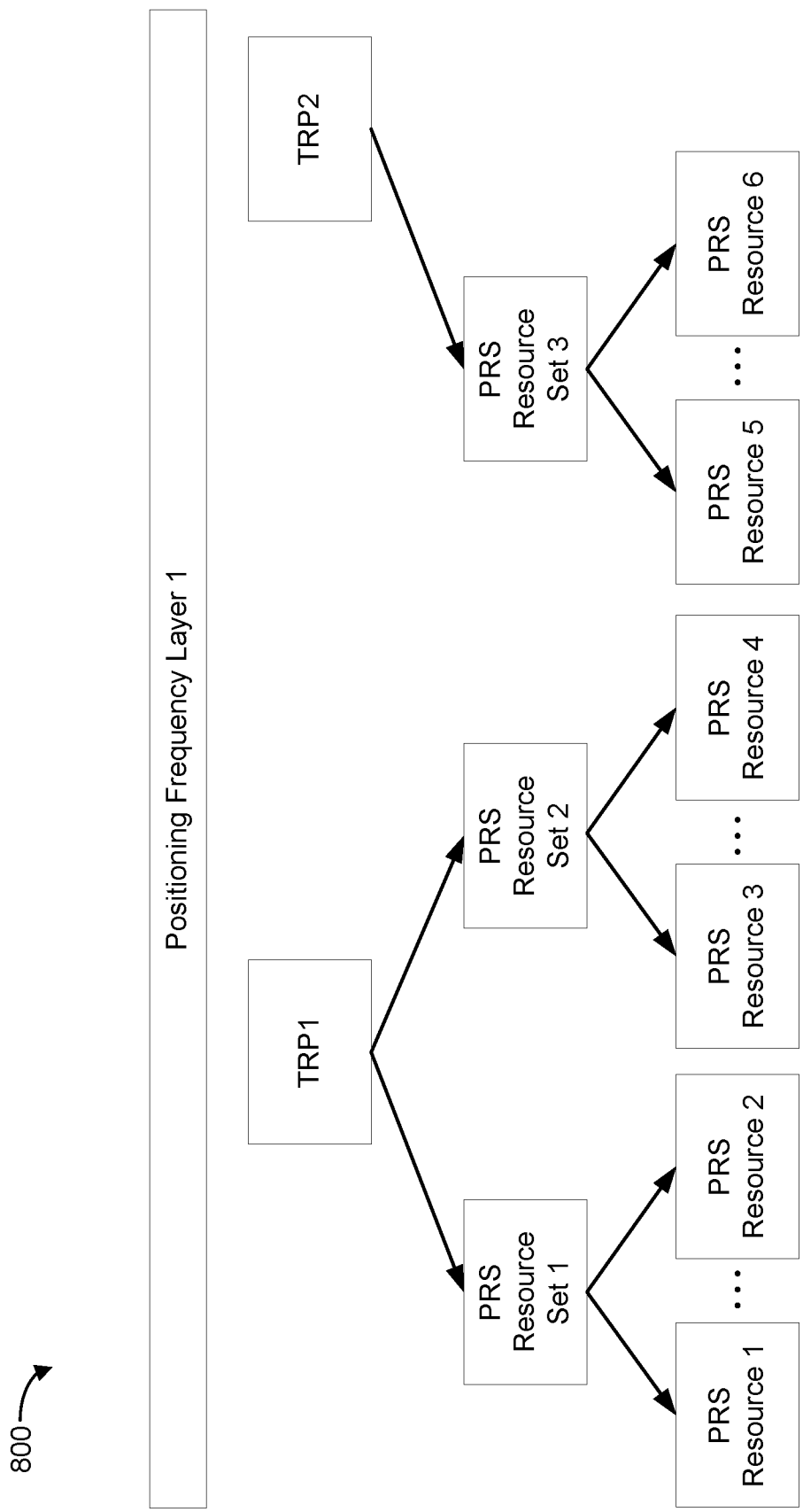
FIG. 8 is a diagram illustrating an example downlink positioning reference signal (DL-PRS) configuration for two transmission-reception points (TRPs) operating in the same positioning frequency layer, according to aspects of the disclosure.

FIG. 8 is a diagram 800 illustrating an example PRS configuration for two TRPs (labeled "TRP1" and "TRP2") operating in the same positioning frequency layer (labeled "Positioning Frequency Layer 1"), according to aspects of the disclosure. For a positioning session, a UE may be provided with assistance data indicating the illustrated PRS configuration. In the example of FIG. 8, the first TRP ("TRP1") is associated with (e.g., transmits) two PRS resource sets, labeled "PRS Resource Set 1" and "PRS Resource Set 2," and the second TRP ("TRP2") is associated with one PRS resource set, labeled "PRS Resource Set 3." Each PRS resource set comprises at least two PRS resources. Specifically, the first PRS resource set ("PRS Resource Set 1") includes PRS resources labeled "PRS Resource 1" and "PRS Resource 2," the second PRS resource set ("PRS Resource Set 2") includes PRS resources labeled "PRS Resource 3" and "PRS Resource 4," and the third PRS resource set ("PRS Resource Set 3") includes PRS resources labeled "PRS Resource 5" and "PRS Resource 6."

Figure 9:
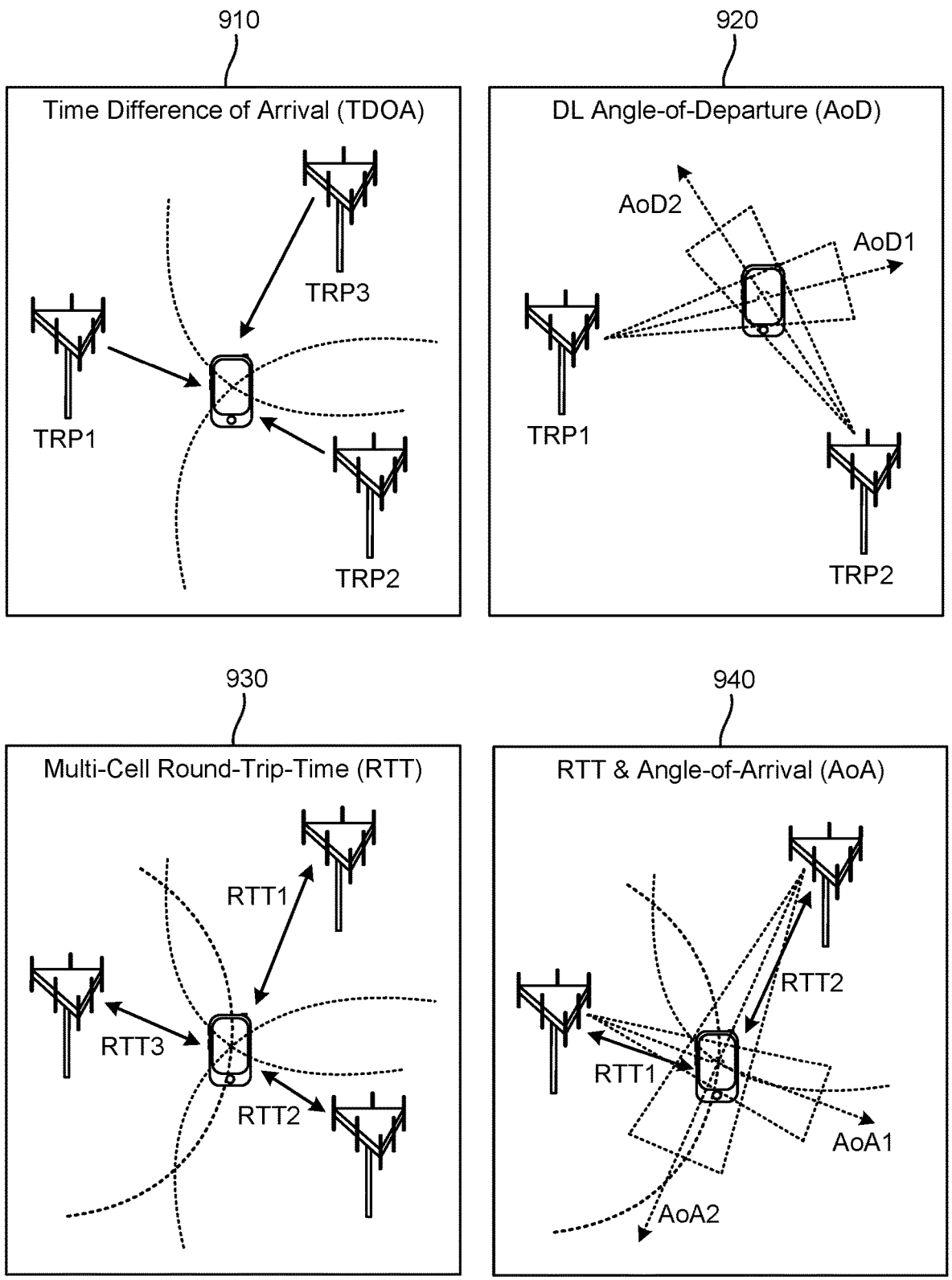
FIG. 9 illustrates examples of various positioning methods supported in New Radio (NR), according to aspects of the disclosure.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 9 illustrates examples of various positioning methods, according to aspects of the disclosure. In an OTDOA or DL-TDOA positioning procedure, illustrated by scenario 910, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 920, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 930, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 940.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 10:
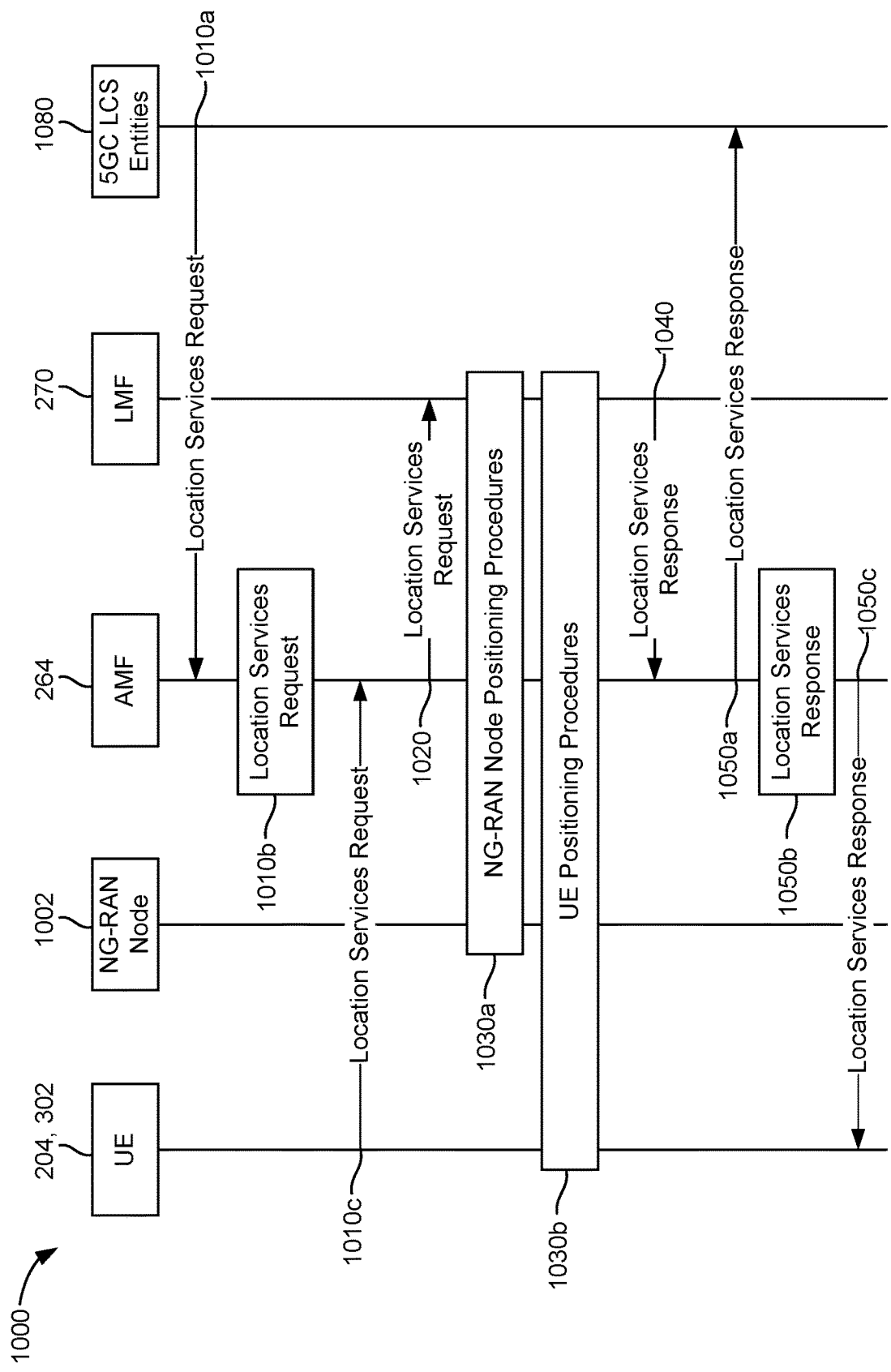
FIG. 10 illustrates an example user equipment (UE) positioning operation, according to aspects of the disclosure.

FIG. 10 illustrates an example UE positioning operation 1000, according to aspects of the disclosure. The UE positioning operation 1000 may be performed by a UE 204, an NG-RAN node 1002 (e.g., gNB 222, gNB-CU 226, ng-eNB 224, or other node in the NG-RAN 220) in the NG-RAN 220, an AMF 264, an LMF 270, and a 5GC location services (LCS) entity 1080 (e.g., any third-party application requesting the UE's 204 location, a public service access point (PSAP), an E-911 server, etc.).

A location services request to obtain the location of a target (i.e., UE 204) may be initiated by a 5GC LCS entity 1080, the AMF 264 serving the UE 204, or the UE 204 itself. FIG. 10 illustrates these options as stages 1010a, 1010b, and 1010c, respectively. Specifically, at stage 1010a, a 5GC LCS entity 1080 sends a location services request to the AMF 264. Alternatively, at stage 1010b, the AMF 264 generates a location services request itself. Alternatively, at stage 1010c, the UE 204 sends a location services request to the AMF 264.

Once the AMF 264 has received (or generated) a location services request, it forwards the location services request to the LMF 270 at stage 1020. The LMF 270 then performs NG-RAN positioning procedures with the NG-RAN node 1002 at stage 1030a and UE positioning procedures with the UE 204 at stage 1030b. The specific NG-RAN positioning procedures and UE positioning procedures may depend on the type(s) of positioning method(s) used to locate the UE 204, which may depend on the capabilities of the UE 204. The positioning method(s) may be downlink-based (e.g., LTE-OTDOA, DL-TDOA, DL-AoD, etc.), uplink-based (e.g., UL-TDOA, UL-AoA, etc.), and/or downlink-and-uplink-based (e.g., LTE/NR E-CID, multi-RTT, etc.), as described above. Corresponding positioning procedures are described in detail in 3GPP Technical Specification (TS) 38.305, which is publicly available and incorporated by reference herein in its entirety.

The NG-RAN positioning procedures and UE positioning procedures may utilize LTE positioning protocol (LPP) signaling between the UE 204 and the LMF 270 and LPP type A (LPPa) or New Radio positioning protocol type A (NRPPa) signaling between the NG-RAN node 1002 and the LMF 270. LPP is used point-to-point between a location server (e.g., LMF 270) and a UE (e.g., UE 204) in order to obtain location-related measurements or a location estimate or to transfer assistance data. A single LPP session is used to support a single location request (e.g., for a single mobile-terminated location request (MT-LR), mobile-originated location request (MO-LR), or network induced location request (NI-LR)). Multiple LPP sessions can be used between the same endpoints to support multiple different location requests. Each LPP session comprises one or more LPP transactions, with each LPP transaction performing a single operation (e.g., capability exchange, assistance data transfer, location information transfer). LPP transactions are referred to as LPP procedures.

A prerequisite for stage 1030 is that an LCS Correlation identifier (ID) and an AMF ID has been passed to the LMF 270 by the serving AMF 264. Both, the LCS Correlation ID and the AMF ID may be represented as a string of characters selected by the AMF 264. The LCS Correlation ID and the AMF ID are provided by the AMF 264 to the LMF 270 in the location services request at stage 1020. When the LMF 270 then instigates stage 1030, the LMF 270 also includes the LCS Correlation ID for this location session, together with the AMF ID, which indicates the AMF instance serving the UE 204. The LCS Correlation ID is used to ensure that during a positioning session between the LMF 270 and the UE 204, positioning response messages from the UE 204 are returned by the AMF 264 to the correct LMF 270 and carrying an indication (the LCS Correlation ID) that can be recognized by the LMF 270.

Note that the LCS Correlation ID serves as a location session identifier that may be used to identify messages exchanged between the AMF 264 and the LMF 270 for a particular location session for a UE 204, as described in greater detail in 3GPP TS 23.273, which is publicly available and incorporated by reference herein in its entirety. As mentioned above and shown in stage 1020, a location session between an AMF 264 and an LMF 270 for a particular UE 204 is instigated by the AMF 264, and the LCS Correlation ID may be used to identify this location session (e.g., may be used by the AMF 264 to identify state information for this location session, etc.).

LPP positioning methods and associated signaling content are defined in the 3GPP LPP standard (3GPP TS 37.355, which is publicly available and incorporated by reference herein in its entirety). LPP signaling can be used to request and report measurements related to the following positioning methods: LTE-OTDOA, DL-TDOA, A-GNSS, E-CID, sensor, TBS, WLAN, Bluetooth, DL-AoD, UL-AoA, and multi-RTT. Currently, LPP measurement reports may contain the following measurements: (1) one or more ToA, TDOA, RSTD, or Rx-Tx time difference measurements, (2) one or more AoA and/or AoD measurements (currently only for a base station to report UL-AoA and DL-AoD to the LMF 270), (3) one or more multipath measurements (per-path ToA, RSRP, AoA/AoD), (4) one or more motion states (e.g., walking, driving, etc.) and trajectories (currently only for the UE 204), and (5) one or more report quality indications.

As part of the NG-RAN node positioning procedures (stage 1030a) and UE positioning procedures (stage 1030b), the LMF 270 may provide LPP assistance data in the form of downlink positioning reference signal (DL-PRS) configuration information to the NG-RAN node 1002 and the UE 204 for the selected positioning method(s). Alternatively or additionally, the NG-RAN node 1002 may provide DL-PRS and/or uplink PRS (UL-PRS) configuration information to the UE 204 for the selected positioning method(s). Note that while FIG. 10 illustrates a single NG-RAN node 1002, there may be multiple NG-RAN nodes 1002 involved in the positioning session.

Once configured with the DL-PRS and/or UL-PRS configurations, the NG-RAN node 1002 and the UE 204 transmit and receive/measure the respective PRS at the scheduled times. The NG-RAN node 1002 and the UE 204 then send their respective measurements to the LMF 270.

Once the LMF 270 obtains the measurements from the UE 204 and/or the NG-RAN node 1002 (depending on the type(s) of positioning method(s)), it calculates an estimate of the UE's 204 location using those measurements. Then, at stage 1040, the LMF 270 sends a location services response, which includes the location estimate for the UE 204, to the AMF 264. The AMF 264 then forwards the location services response to the entity that generated the location services request at stage 1050. Specifically, if the location services request was received from a 5GC LCS entity 1080 at stage 1010a, then at stage 1050a, the AMF 264 sends a location services response to the 5GC LCS entity 1080. If, however, the location services request was received from the UE 204 at stage 1010c, then at stage 1050c, the AMF 264 sends a location services response to the UE 204. Or, if the AMF 264 generated the location services request at stage 1010b, then at stage 1050b, the AMF 264 stores/uses the location services response itself.

Note that although the foregoing has described the UE positioning operation 1000 as a UE-assisted positioning operation, it may instead be a UE-based positioning operation. A UE-assisted positioning operation is one where the LMF 270 calculates the location of the UE 204, whereas a UE-based positioning operation is one where the UE 204 calculates its own location.

For an on-demand PRS-based UE positioning sessions such as the process of FIG. 10, there is very little delay from the time at which a location services request is issued (e.g., at 1010a, 1010b or 1010c) to when the NG-RAN node positioning procedures (stage 1030a) and/or UE positioning procedures (stage 1030b) are performed. In this case, the location services request may request certain parameters for the on-demand PRS positioning session, and the availability of the requested parameters can be ascertained in real-time (e.g., since there is no significant gap from the location services request to the on-demand PRS positioning session, the availability of the requested parameter(s) can simply be checked once, and if available, allocated to the on-demand PRS positioning session).

In some designs, there are situations where UE location is required to be known at some time T in the future. In some designs, there may be a one-shot request for location at time T, or periodic location request, with first instance starting at time T. The need to track future UE location can occur in various use cases, such as IIoT, V2X, asset-tracking, etc.

In some designs, PRS positioning may require measurement information associated with both on-demand PRS and scheduled PRS (e.g., periodic or semi-persistent PRS). One problem that may occur is that the UE may move in between measurements if the on-demand PRS and scheduled PRS are separated by a large time gap. Also, clock drift may cause additional timing errors. To limit these problems, UE may need to ask to schedule on-demand PRS within a required time window in the future (e.g., to align all the PRSs of the positioning session). However, some on-demand PRS configurations may not be available immediately to UE after the request if the scheduled time in the request is in the far future. For example, if a UE requests to schedule on-demand SL PRS from a specific mobile UE 1 hour in the future, the configuration to target UE because the SL anchor may not be in the proximity of target UE at that time. In a specific use case, autonomous vehicle may move following a planned trajectory in the factory and request to schedule the on-demand PRS at future time T_1 roughly within region R. The on-demand PRS might be from any anchor (TRP or SL). Uu PRS may be able to configured in advance, but LMF cannot predict which mobile SL anchor will be available at time T1 around region R (e.g., other robots might experience blockage so the planned trajectory cannot be followed).

Aspects of the disclosure are directed to a request to schedule an on-demand PRS positioning session of the UE at a future time, wherein the request is configured to request a first set of parameters for the scheduled on-demand PRS positioning session. In contrast to a legacy on-demand PRS positioning session where an availability of any requested parameters can simply be checked in real-time and then (if available) allocated to the on-demand PRS positioning session, in accordance with aspects of the disclosure, an availability of one or more parameters of the first set of parameters at the future time are indeterminable when the request is transmitted. A position estimation entity may then follow-up in advance of the future time with a PRS configuration for the scheduled on-demand PRS positioning session that includes a second set of parameters that is based at least in part on the availability of the one or more parameters at the future time. Such aspects may provide various technical advantages, such as facilitating on-demand PRS positioning at future times, rather than being limited to scheduling of real-time on-demand PRS positioning as in legacy systems. Also, in some designs, overhead may be reduced since the future on-demand PRS can be scheduled without having to setup periodic broadcast PRS.

Figure 11:
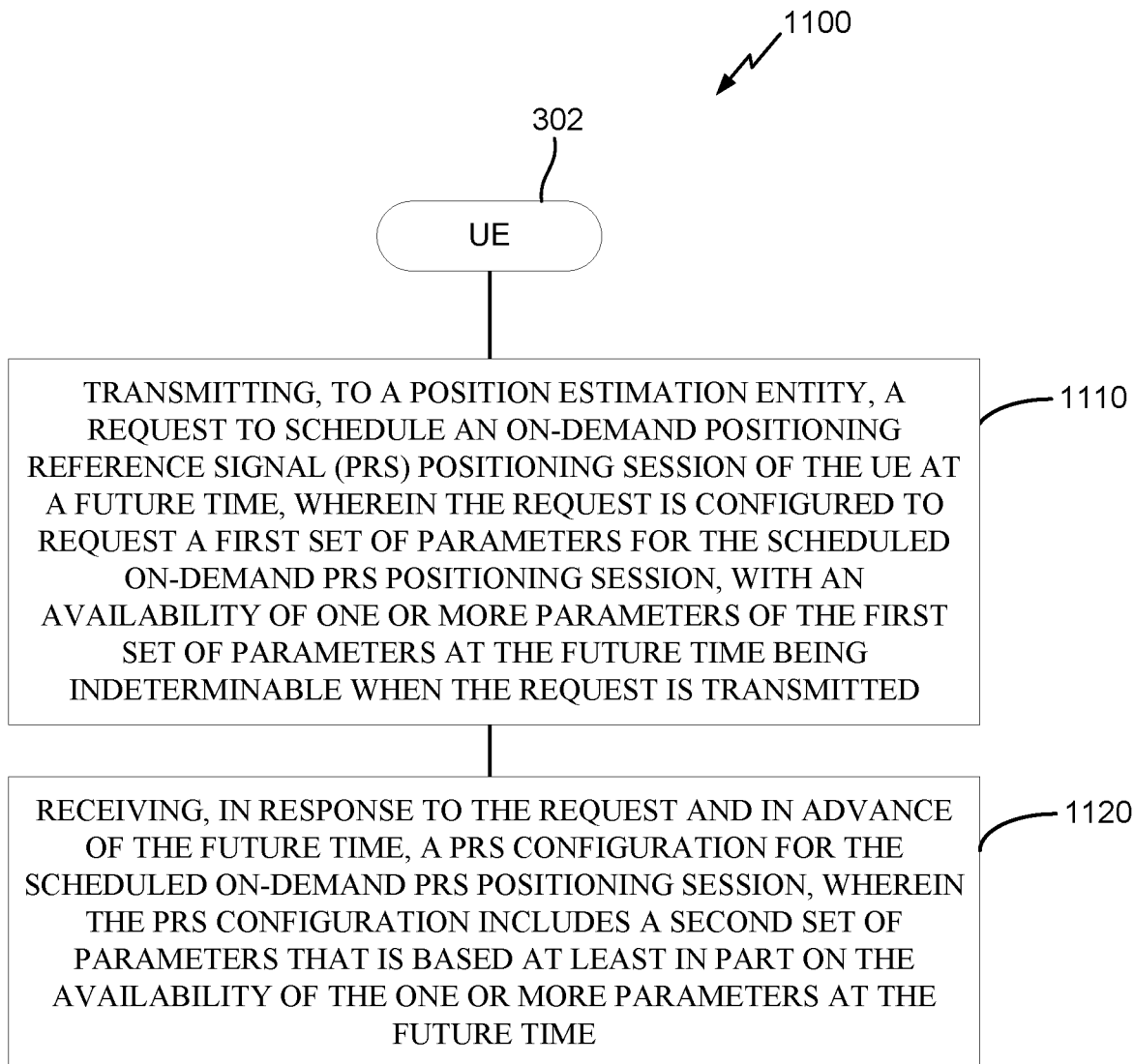
FIG. 11 illustrates an exemplary process of wireless communication, according to aspects of the disclosure

FIG. 11 illustrates an exemplary process 1100 of wireless communication, according to aspects of the disclosure. In an aspect, the process 1100 may be performed by a UE (e.g., a UE for which position estimation is desired), such as UE 302.

Referring to FIG. 11, at 1110, UE 302 (e.g., transmitter 314 or 324, data bus 334, etc.) transmits, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted. In some designs, the position estimation entity may correspond to the UE itself (e.g., for UE-based position estimation) or BS 304 (e.g., LMF integrated in RAN) or network entity 306 (e.g., LMF integrated in core network component, a location server, etc.). In case of UE-based position estimation, the transmission of 1110 may correspond to an internal transfer of data between logical components or alternatively to a transmission to an external component such as gNB or LMF.

Referring to FIG. 11, at 1120, UE 302 (e.g., receiver 312 or 322, data bus 334, etc.) receives, in response to the request and in advance of the future time, a PRS configuration for the scheduled on-demand PRS positioning session, wherein the PRS configuration includes a second set of parameters that is based at least in part on the availability of the one or more parameters at the future time. In some designs, the position estimation entity may correspond to the UE itself (e.g., for UE-based position estimation) or BS 304 (e.g., LMF integrated in RAN) or network entity 306 (e.g., LMF integrated in core network component, a location server, etc.). In case of UE-based position estimation, the reception of 1120 may correspond to an internal transfer of data between logical components or alternatively to a reception from an external component such as gNB or LMF.

Figure 12:
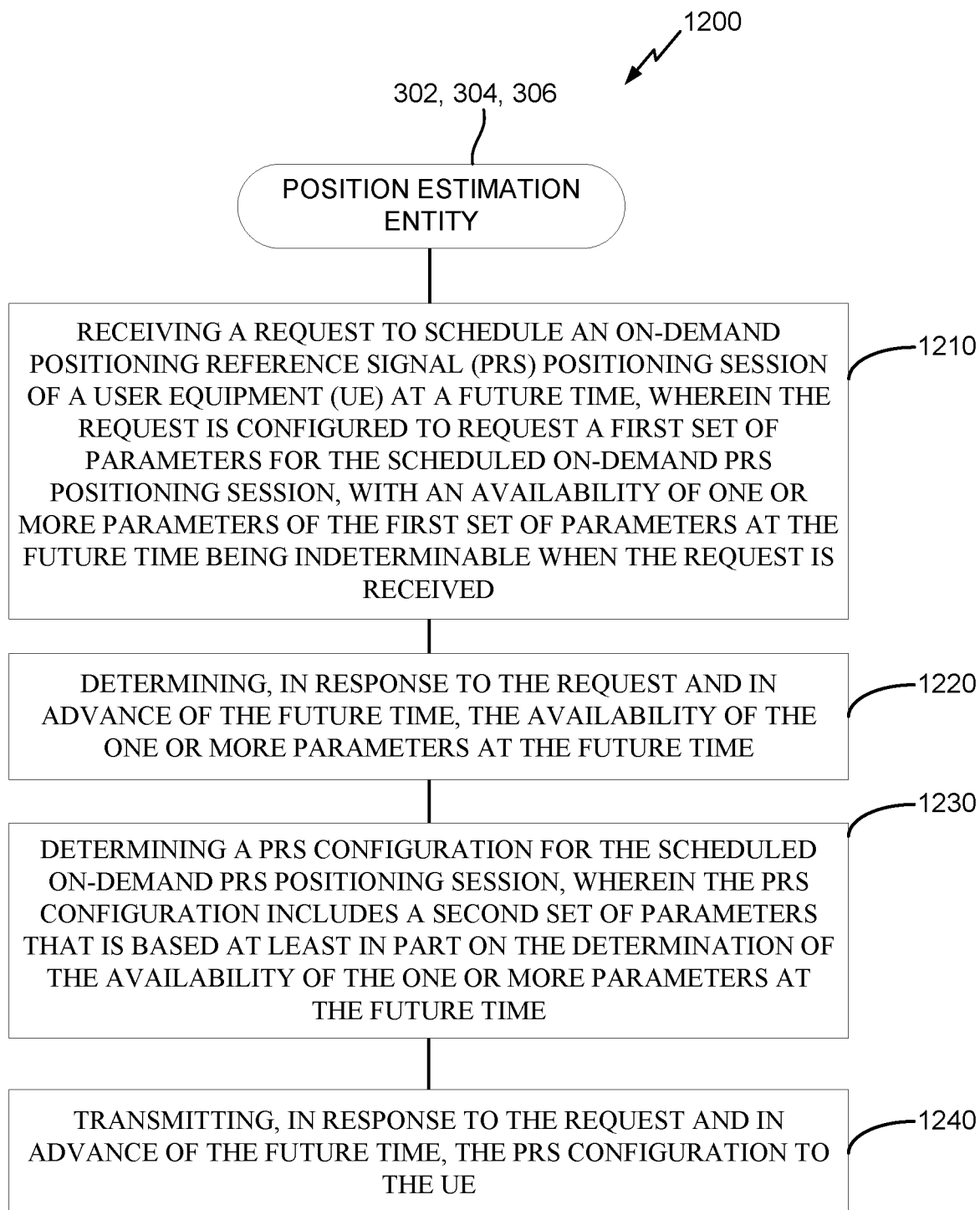
FIG. 12 illustrates an exemplary process of wireless communication, according to aspects of the disclosure

FIG. 12 illustrates an exemplary process 1200 of wireless communication, according to aspects of the disclosure. In an aspect, the process 1200 may be performed by a position estimation entity. In some designs, the position estimation entity may correspond to UE 302 (e.g., for UE-based position estimation) or BS 304 (e.g., LMF integrated in RAN) or network entity 306 (e.g., LMF integrated in core network component, a location server, etc.).

Referring to FIG. 12, at 1210, the position estimation entity (e.g., receiver 312 or 322 or 352 or 362, network transceiver(s) 390, data bus 334 or 382 or 392, etc.) receives a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received. In some designs, the request may be received from a UE as in 1110 of FIG. 11. In other designs, the request may be received from another entity, such as an LCS client or LMF, etc. In case of UE-based position estimation where the request is received from UE, the reception of 1210 may correspond to an internal transfer of data between logical components. In case of UE-assisted position estimation where the request is received from LMF, the reception of 1210 may correspond to an internal transfer of data between logical components.

Referring to FIG. 12, at 1220, the position estimation entity (e.g., processor(s) 332 or 382 or 392, On-Demand PRS Component 342 or 388 or 398, etc.) determines, in response to the request and in advance of the future time, the availability of the one or more parameters at the future time. In some designs, this parameter availability lookup operation may be performed similarly to a legacy parameter availability lookup operation except for its timing. For example, a legacy parameter availability lookup operation is generally performed as soon as a location services request for on-demand PRS is issued (i.e., no delay). However, the parameter availability lookup operation of 1220 may be performed in a delayed manner, or offset from the time at which the request is received at 1210 (e.g., at some future time before the future time at which the on-demand PRS positioning session is to be performed).

Referring to FIG. 12, at 1230, the position estimation entity (e.g., processor(s) 332 or 382 or 392, On-Demand PRS Component 342 or 388 or 398, etc.) determines a PRS configuration for the scheduled on-demand PRS positioning session, wherein the PRS configuration includes a second set of parameters that is based at least in part on the determination of the availability of the one or more parameters at the future time.

Referring to FIG. 12, at 1240, the position estimation entity (e.g., transmitter 314 or 324 or 354 or 364, network transceiver(s) 390, data bus 334 or 382 or 392, etc.) transmits, in response to the request and in advance of the future time, the PRS configuration to the UE. As will be described in more detail, the transmission of 1240 may include a single transmission or multiple transmissions. In case of UE-based position estimation, the transmission of 1240 may correspond to an internal transfer of data between logical components, or may be received from an external component such as gNB or LMF (e.g., anchor locations and/or PRS resources from a specific anchor may be provided to UE by gNB or LMF).

Referring to FIGS. 11-12, in some designs, an "indeterminable" parameter may be distinguished from a "determinable" parameter by respective confidence levels by which the parameter availability can be predicted at the future time. For example, the availability of a particular SL anchor near the target UE in 1 hour has a very low likelihood of successful prediction (e.g., since both the target UE and SL anchor may be mobile devices), and may be characterized as indeterminable.

Referring to FIGS. 11-12, in some designs, the PRS configuration comprises a downlink (DL) PRS configuration, an uplink (UL) PRS configuration, a sidelink (SL) PRS configuration, or a combination thereof.

Figure 13:
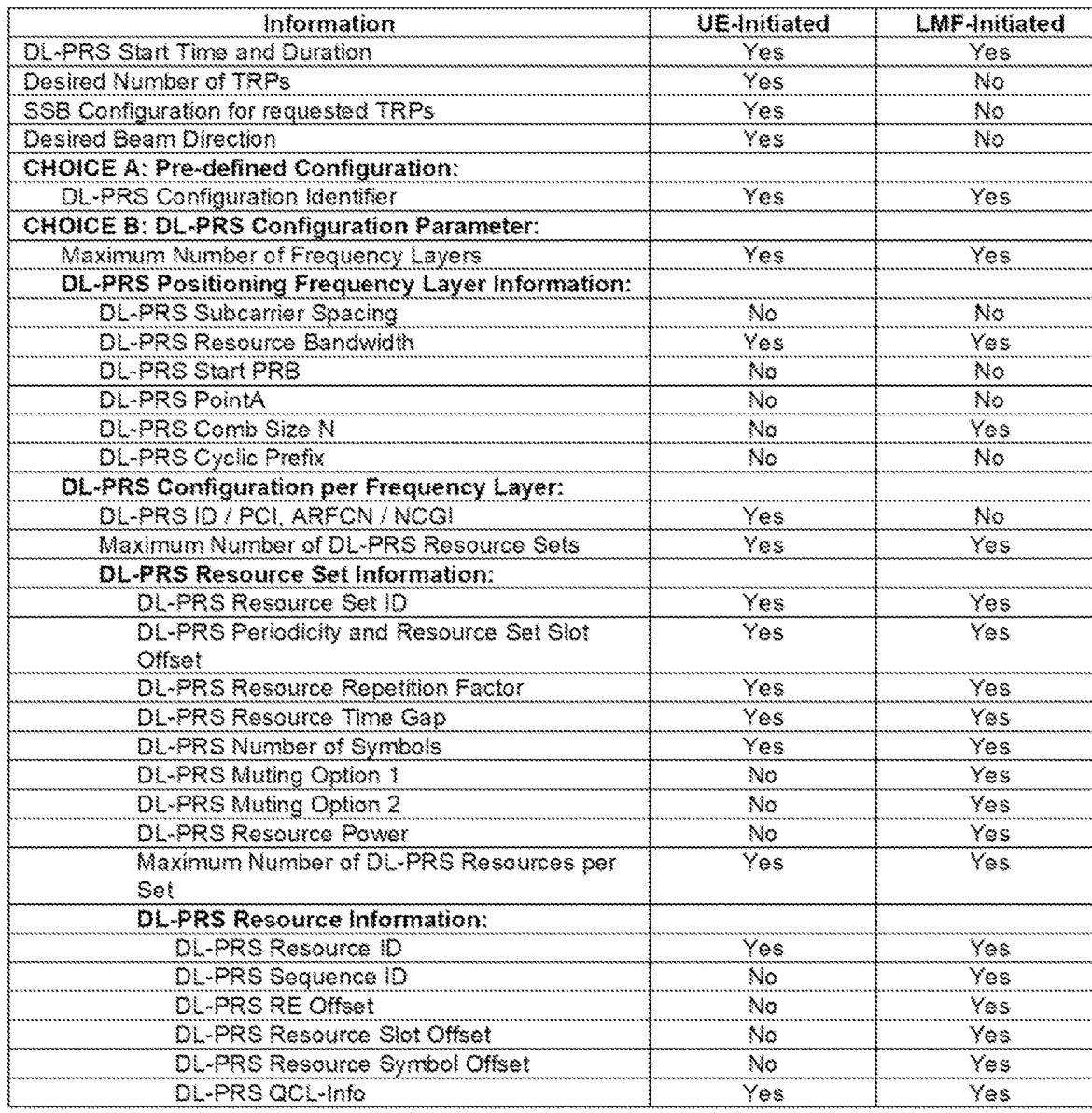
FIG. 13 illustrates on-demand DL PRS parameters that may be requested by UE, LMF, or both in accordance with aspects of the disclosure.

Referring to FIGS. 11-12, in some designs (e.g., 3GPP Rel. 17), various on-demand PRS parameters may be specified. FIG. 13 illustrates on-demand DL PRS parameters 1300 that may be requested by the UE, the LMF, or both in accordance with aspects of the disclosure. In some designs, the requestor of the on-demand PRS session (e.g., UE or LMF or gNB or position estimation entity, etc.) may further specify whether particular parameters are mandatory or optional. In some designs, if mandatary parameters cannot be met, then the position estimation entity may return failure (e.g., cancel the scheduled on-demand PRS positioning session). In some designs, if an optional parameter cannot be met, position estimation entity may configure a compatible parameter or ignore this optional parameter. Hence, in some designs, for each parameter in the first set of parameters, the request at 1110 of FIG. 11 or 1210 of FIG. 12 designates whether a respective parameter is mandatory or optional. In this case, relative to FIG. 13, any parameter associated with a "Yes" may instead be associated with a "Mandatory" or "Optional" designation.

Referring to FIGS. 11-12, in some designs, the first set of parameters includes at least one sidelink (SL) anchor. In this case, in an example, the first set of parameters includes, for the at least one SL anchor, an SL beam direction, an SL bandwidth or bandwidth part (BWP), a synchronization signal block (SSB) configuration, or a combination thereof. In another example, the one or more parameters that are indeterminable when the request is transmitted are associated with the at least one SL anchor due to mobility of the at least one SL anchor. In a further example, one or more other parameters for at least one stationary anchor are determinable when the request is transmitted due to lack of mobility of the least one stationary anchor. Hence, in some designs, the request at 1110 of FIG. 11 or 1210 of FIG. 12 may include indeterminable parameters only, or alternatively a combination of determinable and indeterminable parameters.

Referring to FIGS. 11-12, in some designs, the request specifies the future time via indication of a preferred start time (T) and duration. In some designs, the preferred start time and duration are specified via a set of slots, sub-frames or frames, or the preferred start time and duration are specified in absolute time (e.g., ms or s), or the preferred start time and duration is specified via reference to a future measurement gap or PRS occasion of a current PRS configuration. In some designs, the request may further specify a minimum number of anchors necessary to achieve a target accuracy requirement.

Referring to FIGS. 11-12, in some designs, at least one parameter in the first set of parameters is associated with at least one time constraint. For example, the at least one time constraint limits when the at least one parameter can be requested, modified, or removed from association with the scheduled on-demand PRS positioning session. In a specific example, assume that a UE sends a scheduled on-demand PRS request to positioning entity (PE) to schedule on-demand PRS at future time $T\_1$. In some designs, each preferred parameter $Z\_i$ in the request may be sent within a limited time window $[X\_i, Y\_i]$. In some designs, the parameter $Z\_i$ cannot be requested, modified, or removed earlier than x, and the parameter $Z\_i$ cannot be requested, modified, or removed alter than $Y\_i$ (e.g., because it requires time for position estimation entity to configure/schedule/coordinate based on the required parameter). In some designs, each parameter may have a different time window. Therefore, the on-demand request can be sent in several messages.

In one particular example with one $X\_i$ & $Y\_i$, the position estimation entity (or specification) may define a threshold $T\_r$ for scheduled on-demand request. Only a subset of on-demand PRS parameters is allowed to be specified in the request before $T\_1-T\_r$. Others should be specified later than $T\_1-T\_r$. In one example, a specific SL anchor can be added to the on-demand request only when the current time is close to the scheduled time. Otherwise, the SL anchor may move out of the target UE's proximity. In another example, positioning accuracy requirements can be specified any time. In some designs, LCS client or UE may send on-demand PRS request by several messages over times before time $T\_1$. Each request contains partial desired on-demand PRS parameters (e.g., before the scheduled T1, UE should provide a full customized PRS request; in some designs, a message may add/modify/remove a subset of on-demand parameters in the previous message(s)). In some designs, certain parameters cannot be specified given a threshold. In some designs, the position estimation entity (or specification) may further define a threshold $T\_3$ that no more desired parameter can be added/modified/removed after $T\_1-T\_3$. In an example, this time ($T\_3$) could allow the position estimation entity to configure and schedule a customized PRS based on a fixed preferred parameter set. The timing examples in the various examples provided above may be defined in terms of slots, subframes, frames, absolute time, and so on.

Referring to FIGS. 11-12, in some designs, the PRS configuration is required to be received at the UE within a designated time window. In a specific example, assume that the position estimation entity is required to provide a customized PRS configuration scheduled around $T\_1$. Each on-demand PRS configuration $W\_i$ in the response should be sent within a limited time window $[X\_i, X\_i]$ (e.g., no earlier than X because the position estimation entity cannot determine the configuration/scheduling before this time, and no later than $Y\_i$ because it requires time for UE to adjust the configuration). In some designs, each parameter may have a different time window. Therefore, the on-demand response can be sent in several messages.

In one particular example with one $X\_i$ & $Y\_i$, a timing threshold $T\_\{nf\}$ is defined for far-future/near-future on-demand response. In some designs, a request within threshold ($T\_1<T\_\{nf\}$) is considered as near-future request and the response (i.e., desired customized PRS configuration and scheduling) may be completed by the position estimation entity as soon as possible before time $T\_1$. A request beyond threshold ($T\_1>T\_\{nf\}$) is considered as far-future request. In some designs, the response (configuration and scheduling) can be completed through several messages because some detailed configuration is not available in advance. In some designs, each message contains partial on-demand PRS configurations. In some designs, before the scheduled T1, the position estimation entity may provide a full customized PRS configuration. In context, 'full' means no missing PRS parameters which causes ambiguity or UE need to do blind search. In an example, the position estimation entity may be able to configure on-demand PRS from stationary TRP in the far future, but not mobile anchor. In some designs, the position estimation entity may send the several on-demand PRS responses by several LPP messages over times before the requested time. In some deigns, the position estimation entity or UE may further specify a second timing threshold T_2 that the position estimation entity must respond with a customized PRS configuration before T_1-T_2. In some designs, T_2 is designed so as to provide sufficient time for UE to adjust its configuration/ hardware for on-demand PRS operation. The timing examples in the various examples provided above may be defined in terms of slots, subframes, frames, absolute time, and so on.

Referring to FIGS. 11-12, in some designs as noted above, the PRS configuration is received via a plurality of partial PRS configurations that cumulatively define each of the first set of parameters for the scheduled on-demand PRS positioning session.

Referring to FIGS. 11-12, in some designs, one or more requests for the PRS configuration (e.g., an initial request plus any supplemental requests that modify the PRS parameters, etc.) and one or more responses carrying the PRS configuration may include an identifier that is configured to distinguish the scheduled on-demand PRS positioning session from one or more other scheduled on-demand PRS positioning sessions. For example, if a UE requests multiple on-demand PRS configurations (e.g., each with its own respective on-demand PRS request and response(s)) which overlap in time, the UE and position estimation entity may have trouble differentiating signaling associated with the multiple on-demand PRS configurations. In this case, as noted above, each of the multiple on-demand PRS configurations may be associated with a unique identifier. In some designs, the unique identifier may be assigned by the transmission side (e.g., UE). So, the UE attaches a new identifier in the request at 1110 of FIG. 11 or 1210 of FIG. 12, and the position estimation entity will then associate this new identifier with subsequent signaling associated with the request (e.g., the signaling conveying PRS configuration, signaling from UE requesting one or more changes to the requested PRS parameters, etc.).

Figure 14:
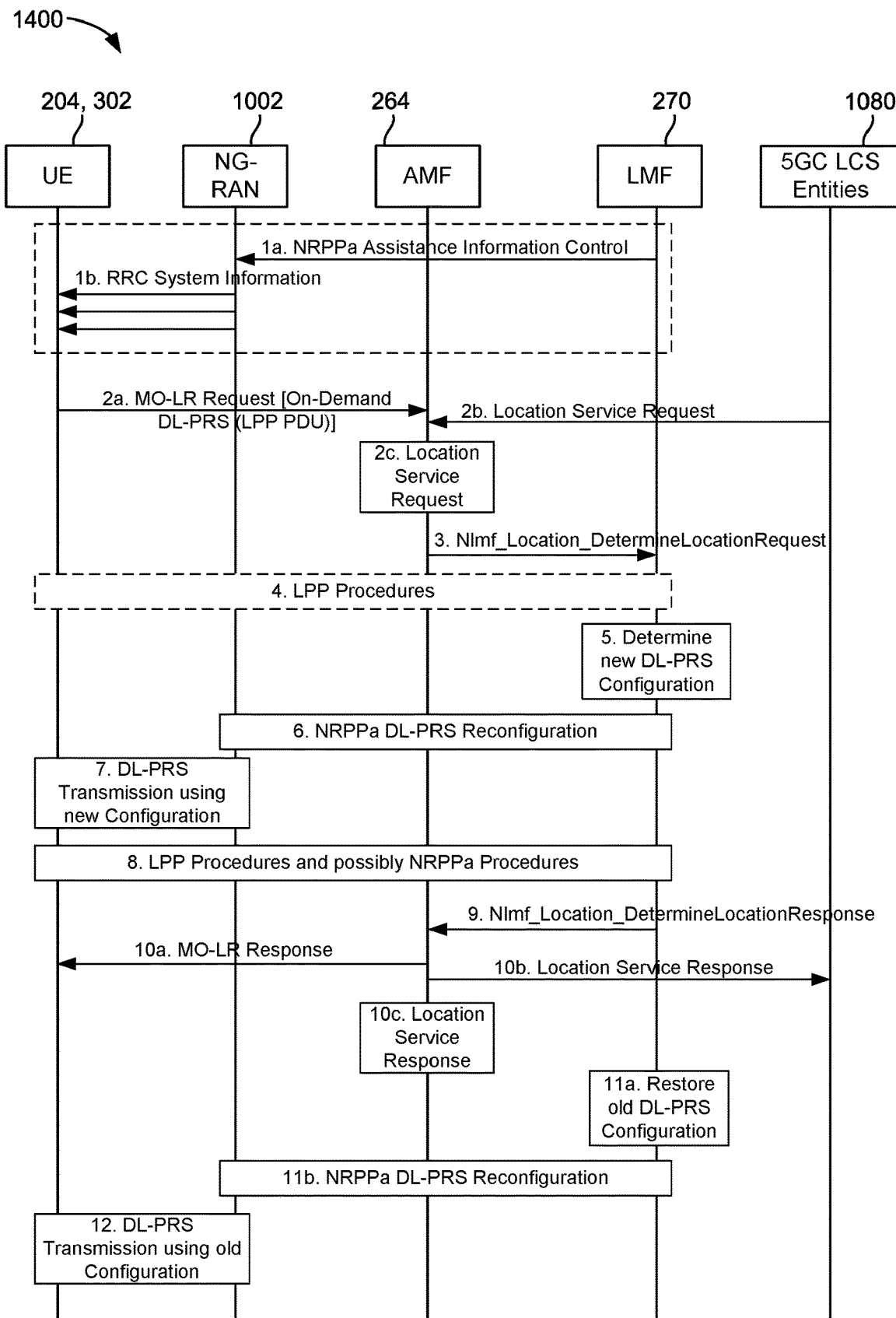
FIG. 14 illustrates an example implementation of the processes of FIGS. 11-12, respectively, in accordance with aspects of the disclosure.

FIG. 14 illustrates an example implementation 1400 of the processes 1100-1200 of FIGS. 11-12, respectively, in accordance with aspects of the disclosure. In particular, the example implementation 1400 relates to on-demand DL PRS in Uu. In FIG. 14, in an example, if the UE has no information on possible on-demand PRS, the UE may request a desired customized PRS configuration. In FIG. 14, in a further example, if the UE has some preconfigured on-demand PRS, the UE may request a specific reconfiguration or switch to a desired configuration. Generally, FIG. 14 depicts a modified implementation of the process 1000 of FIG. 10.

Referring to FIG. 14, LMF 270 sends NRPPa assistance information control to NG-RAN 1002 (1a), which transmits System Information to UE 302 via RRC (1b). Next, a "future" on-demand PRS request is transmitted by UE 302 to AMF 264 (2a), or is transmitted by a 5GC LCS entity 1080 to AMF 264 (2b), or is generated by AMF 264 itself (2c). A location request is sent by AMF 264 to LMF 270 (3). Instead of immediately setting up the PRS configuration, various LPP procedures are performed (4). As the future time for the on-demand PRS approaches, LMF 270 determines a new DL PRS configuration for the on-demand PRS (5). NRPPa DL PRS reconfiguration is performed for the new DL PRS configuration (6), and the DL PRS transmission is performed using the new configuration (7). LPP procedures and optionally NRPPa procedures are performed (8). LMF transmits a location response to AMF 264 (9), which in turn transmits a location response to UE 302 (10a), or to the 5GC LCS entity 1080 (10b), or to AMD 264 (10c) (e.g., logical transfer). LMF 270 then restores an old DL PRS configuration (11a). NRPPa DL PRS reconfiguration is performed for the old DL PRS configuration (11b), and DL PRS transmission is performed using the old configuration (12).

Figure 15:
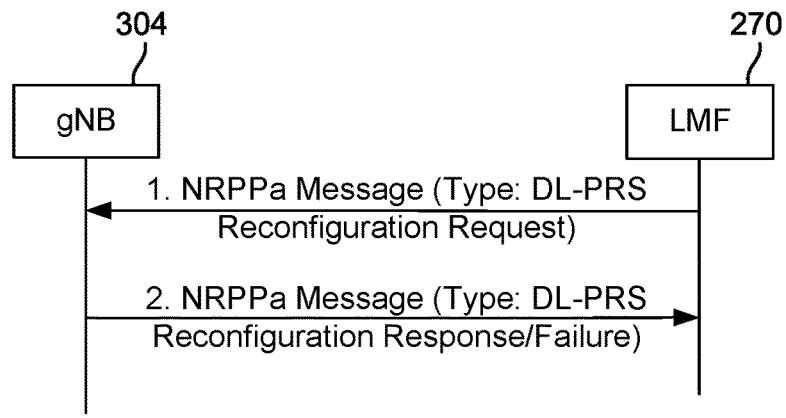
FIG. 15 illustrates an example implementation of the processes of FIGS. 11-12, respectively, in accordance with aspects of the disclosure.

FIG. 15 illustrates an example implementation 1500 of the processes 1100-1200 of FIGS. 11-12, respectively, in accordance with aspects of the disclosure. In particular, FIG. 15 depicts optional signaling that may occur during the process 1400 of FIG. 14. Referring to FIG. 15, LMF 270 transmits a NRPPA message (Type: DL PRS reconfiguration request) to gNB 304 (1). For example, the reconfiguration request at (1) may occur during (6) or (11b) of FIG. 14. In response, gNB 304 transmits a NRPPa message (Type: DL PRS reconfiguration Response/Failure) to LMF 270 (2). As noted above, the reconfiguration request may be granted or rejected based on various constraints (e.g., if too early and the parameter to be reconfigured cannot yet be set, or too late and the parameter can no longer be changed, etc.).

Figure 16:
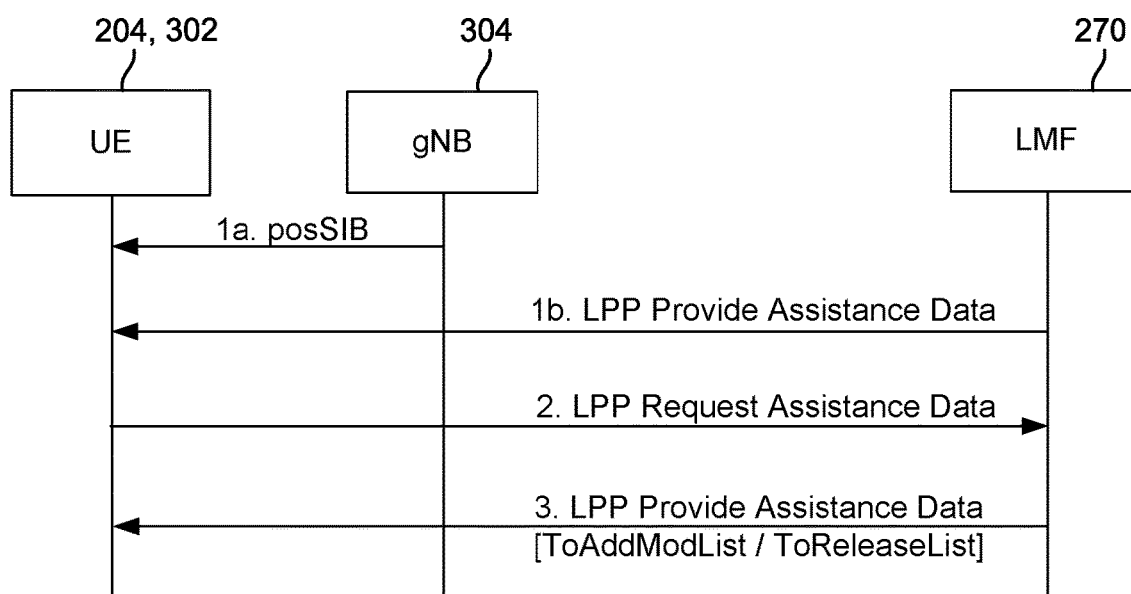
FIG. 16 illustrates an example implementation of the processes of FIGS. 11-12, respectively, in accordance with aspects of the disclosure.

FIG. 16 illustrates an example implementation 1600 of the processes 1100-1200 of FIGS. 11-12, respectively, in accordance with aspects of the disclosure. In particular, FIG. 16 depicts optional signaling that may occur during the process 1400 of FIG. 14. Referring to FIG. 14, gNB 304 transmits a positioning SIB (posSIB) to UE 302 (1a). LMF 270 transmits assistance data to UE 302 via LPP (1b). UE 302 can later transmit a request for updated assistance data via LPP to LMF 270 (2). In response, LMF 270 transmits updated assistance data to UE 302 via LPP (3). For example, at (3), the updated assistance data may modify or add or remove one or more PRS parameters relative to the assistance data from (1b).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of operating a user equipment (UE), comprising: transmitting, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receiving, in response to the request and in advance of the future time, a PRS configuration for the scheduled on-demand PRS positioning session, wherein the PRS configuration includes a second set of parameters that is based at least in part on the availability of the one or more parameters at the future time.

Clause 2. The method of clause 1, wherein the PRS configuration comprises a downlink (DL) PRS configuration, an uplink (UL) PRS configuration, a sidelink (SL) PRS configuration, or a combination thereof.

Clause 3. The method of any of clauses 1 to 2, wherein the request designates whether a respective parameter is mandatory or optional for each parameter in the first set of parameters.

Clause 4. The method of any of clauses 1 to 3, wherein the first set of parameters includes at least one sidelink (SL) anchor.

Clause 5. The method of clause 4, wherein the first set of parameters includes, for the at least one SL anchor, an SL beam direction, an SL bandwidth or bandwidth part (BWP), a synchronization signal block (SSB) configuration, or a combination thereof.

Clause 6. The method of any of clauses 4 to 5, wherein the one or more parameters that are indeterminable when the request is transmitted are associated with the at least one SL anchor due to mobility of the at least one SL anchor.

Clause 7. The method of clause 6, wherein one or more other parameters for at least one stationary anchor are determinable when the request is transmitted due to lack of mobility of the least one stationary anchor.

Clause 8. The method of any of clauses 1 to 7, wherein the request specifies the future time via indication of a preferred start time and duration.

Clause 9. The method of clause 8, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 10. The method of any of clauses 1 to 9, wherein at least one parameter in the first set of parameters is associated with at least one time constraint.

Clause 11. The method of clause 10, wherein the at least one time constraint limits when the at least one parameter can be requested, modified, or removed from association with the scheduled on-demand PRS positioning session.

Clause 12. The method of any of clauses 1 to 11, wherein the PRS configuration is required to be received within a designated time window.

Clause 13. The method of any of clauses 1 to 12, wherein the PRS configuration is received via a plurality of partial PRS configurations that cumulatively define each of the first set of parameters for the scheduled on-demand PRS positioning session.

Clause 14. The method of any of clauses 1 to 13, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 15. A method of operating a position estimation entity, comprising: receiving a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determining, in response to the request and in advance of the future time, the availability of the one or more parameters at the future time; determining a PRS configuration for the scheduled on-demand PRS positioning session, wherein the PRS configuration includes a second set of parameters that is based at least in part on the determination of the availability of the one or more parameters at the future time; and transmitting, in response to the request and in advance of the future time, the PRS configuration to the UE.

Clause 16. The method of clause 15, wherein the PRS configuration comprises a downlink (DL) PRS configuration, an uplink (UL) PRS configuration, a sidelink (SL) PRS configuration, or a combination thereof.

Clause 17. The method of any of clauses 15 to 16, wherein the request designates whether a respective parameter is mandatory or optional for each parameter in the first set of parameters.

Clause 18. The method of any of clauses 15 to 17, wherein the first set of parameters includes at least one sidelink (SL) anchor.

Clause 19. The method of clause 18, wherein the first set of parameters includes, for the at least one SL anchor, an SL beam direction, an SL bandwidth or bandwidth part (BWP), a synchronization signal block (SSB) configuration, or a combination thereof.

Clause 20. The method of any of clauses 18 to 19, wherein the one or more parameters that are indeterminable when the request is transmitted are associated with the at least one SL anchor due to mobility of the at least one SL anchor.

Clause 21. The method of clause 20, wherein one or more other parameters for at least one stationary anchor are determinable when the request is transmitted due to lack of mobility of the least one stationary anchor.

Clause 22. The method of any of clauses 15 to 21, wherein the request specifies the future time via indication of a preferred start time and duration.

Clause 23. The method of any of clause 22, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 24. The method of any of clauses 15 to 23, wherein at least one parameter in the first set of parameters is associated with at least one time constraint.

Clause 25. The method of clause 24, wherein the at least one time constraint limits when the at least one parameter can be requested, modified, or removed from association with the scheduled on-demand PRS positioning session.

Clause 26. The method of any of clauses 15 to 25, wherein the PRS configuration is required to be received within a designated time window.

Clause 27. The method of any of clauses 15 to 26, wherein the PRS configuration is transmitted via a plurality of partial PRS configurations that cumulatively define each of the first set of parameters for the scheduled on-demand PRS positioning session.

Clause 28. The method of any of clauses 15 to 27, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 29. A user equipment (UE), comprising: a memory; at least one transceiver; and at least one processor communicatively coupled to the memory and the at least one transceiver, the at least one processor configured to: transmit, via the at least one transceiver, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receive, via the at least one transceiver, in response to the request and in advance of the future time, a PRS configuration for the scheduled on-demand PRS positioning session, wherein the PRS configuration includes a second set of parameters that is based at least in part on the availability of the one or more parameters at the future time.

Clause 30. The UE of clause 29, wherein the PRS configuration comprises a downlink (DL) PRS configuration, an uplink (UL) PRS configuration, a sidelink (SL) PRS configuration, or a combination thereof.

Clause 31. The UE of any of clauses 29 to 30, wherein the request designates whether a respective parameter is mandatory or optional for each parameter in the first set of parameters.

Clause 32. The UE of any of clauses 29 to 31, wherein the first set of parameters includes at least one sidelink (SL) anchor.

Clause 33. The UE of clause 32, wherein the first set of parameters includes, for the at least one SL anchor, an SL beam direction, an SL bandwidth or bandwidth part (BWP), a synchronization signal block (SSB) configuration, or a combination thereof.

Clause 34. The UE of any of clauses 32 to 33, wherein the one or more parameters that are indeterminable when the request is transmitted are associated with the at least one SL anchor due to mobility of the at least one SL anchor.

Clause 35. The UE of clause 34, wherein one or more other parameters for at least one stationary anchor are determinable when the request is transmitted due to lack of mobility of the least one stationary anchor.

Clause 36. The UE of any of clauses 29 to 35, wherein the request specifies the future time via indication of a preferred start time and duration.

Clause 37. The UE of clause 36, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 38. The UE of any of clauses 29 to 37, wherein at least one parameter in the first set of parameters is associated with at least one time constraint.

Clause 39. The UE of clause 38, wherein the at least one time constraint limits when the at least one parameter can be requested, modified, or removed from association with the scheduled on-demand PRS positioning session.

Clause 40. The UE of any of clauses 29 to 39, wherein the PRS configuration is required to be received within a designated time window.

Clause 41. The UE of any of clauses 29 to 40, wherein the PRS configuration is received via a plurality of partial PRS configurations that cumulatively define each of the first set of parameters for the scheduled on-demand PRS positioning session.

Clause 42. The UE of any of clauses 29 to 41, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 43. A position estimation entity, comprising: a memory; at least one transceiver; and at least one processor communicatively coupled to the memory and the at least one transceiver, the at least one processor configured to: receive, via the at least one transceiver, a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determine, in response to the request and in advance of the future time, the availability of the one or more parameters at the future time; determine a PRS configuration for the scheduled on-demand PRS positioning session, wherein the PRS configuration includes a second set of parameters that is based at least in part on the determination of the availability of the one or more parameters at the future time; and transmit, via the at least one transceiver, in response to the request and in advance of the future time, the PRS configuration to the UE.

Clause 44. The position estimation entity of clause 43, wherein the PRS configuration comprises a downlink (DL) PRS configuration, an uplink (UL) PRS configuration, a sidelink (SL) PRS configuration, or a combination thereof.

Clause 45. The position estimation entity of any of clauses 43 to 44, wherein the request designates whether a respective parameter is mandatory or optional for each parameter in the first set of parameters.

Clause 46. The position estimation entity of any of clauses 43 to 45, wherein the first set of parameters includes at least one sidelink (SL) anchor.

Clause 47. The position estimation entity of clause 46, wherein the first set of parameters includes, for the at least one SL anchor, an SL beam direction, an SL bandwidth or bandwidth part (BWP), a synchronization signal block (SSB) configuration, or a combination thereof.

Clause 48. The position estimation entity of any of clauses 46 to 47, wherein the one or more parameters that are indeterminable when the request is transmitted are associated with the at least one SL anchor due to mobility of the at least one SL anchor.

Clause 49. The position estimation entity of clause 48, wherein one or more other parameters for at least one stationary anchor are determinable when the request is transmitted due to lack of mobility of the least one stationary anchor.

Clause 50. The position estimation entity of any of clauses 43 to 49, wherein the request specifies the future time via indication of a preferred start time and duration.

Clause 51. The position estimation entity of clause 50, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 52. The position estimation entity of any of clauses 43 to 51, wherein at least one parameter in the first set of parameters is associated with at least one time constraint.

Clause 53. The position estimation entity of clause 52, wherein the at least one time constraint limits when the at least one parameter can be requested, modified, or removed from association with the scheduled on-demand PRS positioning session.

Clause 54. The position estimation entity of any of clauses 43 to 53, wherein the PRS configuration is required to be received within a designated time window.

Clause 55. The position estimation entity of any of clauses 43 to 54, wherein the PRS configuration is transmitted via a plurality of partial PRS configurations that cumulatively define each of the first set of parameters for the scheduled on-demand PRS positioning session.

Clause 56. The position estimation entity of any of clauses 43 to 55, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 57. A user equipment (UE), comprising: means for transmitting, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and means for receiving, in response to the request and in advance of the future time, a PRS configuration for the scheduled on-demand PRS positioning session, wherein the PRS configuration includes a second set of parameters that is based at least in part on the availability of the one or more parameters at the future time.

Clause 58. The UE of clause 57, wherein the PRS configuration comprises a downlink (DL) PRS configuration, an uplink (UL) PRS configuration, a sidelink (SL) PRS configuration, or a combination thereof.

Clause 59. The UE of any of clauses 57 to 58, wherein the request designates whether a respective parameter is mandatory or optional for each parameter in the first set of parameters.

Clause 60. The UE of any of clauses 57 to 59, wherein the first set of parameters includes at least one sidelink (SL) anchor.

Clause 61. The UE of clause 60, wherein the first set of parameters includes, for the at least one SL anchor, an SL beam direction, an SL bandwidth or bandwidth part (BWP), a synchronization signal block (SSB) configuration, or a combination thereof.

Clause 62. The UE of any of clauses 60 to 61, wherein the one or more parameters that are indeterminable when the request is transmitted are associated with the at least one SL anchor due to mobility of the at least one SL anchor.

Clause 63. The UE of clause 62, wherein one or more other parameters for at least one stationary anchor are determinable when the request is transmitted due to lack of mobility of the least one stationary anchor.

Clause 64. The UE of any of clauses 57 to 63, wherein the request specifies the future time via indication of a preferred start time and duration.

Clause 65. The UE of clause 64, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 66. The UE of any of clauses 57 to 65, wherein at least one parameter in the first set of parameters is associated with at least one time constraint.

Clause 67. The UE of clause 66, wherein the at least one time constraint limits when the at least one parameter can be requested, modified, or removed from association with the scheduled on-demand PRS positioning session.

Clause 68. The UE of any of clauses 57 to 67, wherein the PRS configuration is required to be received within a designated time window.

Clause 69. The UE of any of clauses 57 to 68, wherein the PRS configuration is received via a plurality of partial PRS configurations that cumulatively define each of the first set of parameters for the scheduled on-demand PRS positioning session.

Clause 70. The UE of any of clauses 57 to 69, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 71. A position estimation entity, comprising: means for receiving a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; means for determining, in response to the request and in advance of the future time, the availability of the one or more parameters at the future time; means for determining a PRS configuration for the scheduled on-demand PRS positioning session, wherein the PRS configuration includes a second set of parameters that is based at least in part on the determination of the availability of the one or more parameters at the future time; and means for transmitting, in response to the request and in advance of the future time, the PRS configuration to the UE.

Clause 72. The position estimation entity of clause 71, wherein the PRS configuration comprises a downlink (DL) PRS configuration, an uplink (UL) PRS configuration, a sidelink (SL) PRS configuration, or a combination thereof.

Clause 73. The position estimation entity of any of clauses 71 to 72, wherein the request designates whether a respective parameter is mandatory or optional for each parameter in the first set of parameters.

Clause 74. The position estimation entity of any of clauses 71 to 73, wherein the first set of parameters includes at least one sidelink (SL) anchor.

Clause 75. The position estimation entity of clause 74, wherein the first set of parameters includes, for the at least one SL anchor, an SL beam direction, an SL bandwidth or bandwidth part (BWP), a synchronization signal block (SSB) configuration, or a combination thereof.

Clause 76. The position estimation entity of any of clauses 74 to 75, wherein the one or more parameters that are indeterminable when the request is transmitted are associated with the at least one SL anchor due to mobility of the at least one SL anchor.

Clause 77. The position estimation entity of clause 76, wherein one or more other parameters for at least one stationary anchor are determinable when the request is transmitted due to lack of mobility of the least one stationary anchor.

Clause 78. The position estimation entity of any of clauses 71 to 77, wherein the request specifies the future time via indication of a preferred start time and duration.

Clause 79. The position estimation entity of clause 78, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 80. The position estimation entity of any of clauses 71 to 79, wherein at least one parameter in the first set of parameters is associated with at least one time constraint.

Clause 81. The position estimation entity of clause 80, wherein the at least one time constraint limits when the at least one parameter can be requested, modified, or removed from association with the scheduled on-demand PRS positioning session.

Clause 82. The position estimation entity of any of clauses 71 to 81, wherein the PRS configuration is required to be received within a designated time window.

Clause 83. The position estimation entity of any of clauses 71 to 82, wherein the PRS configuration is transmitted via a plurality of partial PRS configurations that cumulatively define each of the first set of parameters for the scheduled on-demand PRS positioning session.

Clause 84. The position estimation entity of any of clauses 71 to 83, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 85. A non-transitory computer-readable medium storing computer-executable instructions that, when executed by a user equipment (UE), cause the UE to: transmit, to a position estimation entity, a request to schedule an on-demand positioning reference signal (PRS) positioning session of the UE at a future time, wherein the request is configured to request a first set of parameters for the scheduled on-demand PRS positioning session, with an availability of one or more parameters of the first set of parameters at the future time being indeterminable when the request is transmitted; and receive, in response to the request and in advance of the future time, a PRS configuration for the scheduled on-demand PRS positioning session, wherein the PRS configuration includes a second set of parameters that is based at least in part on the availability of the one or more parameters at the future time.

Clause 86. The non-transitory computer-readable medium of clause 85, wherein the PRS configuration comprises a downlink (DL) PRS configuration, an uplink (UL) PRS configuration, a sidelink (SL) PRS configuration, or a combination thereof.

Clause 87. The non-transitory computer-readable medium of any of clauses 85 to 86, wherein the request designates whether a respective parameter is mandatory or optional for each parameter in the first set of parameters.

Clause 88. The non-transitory computer-readable medium of any of clauses 85 to 87, wherein the first set of parameters includes at least one sidelink (SL) anchor.

Clause 89. The non-transitory computer-readable medium of clause 88, wherein the first set of parameters includes, for the at least one SL anchor, an SL beam direction, an SL bandwidth or bandwidth part (BWP), a synchronization signal block (SSB) configuration, or a combination thereof.

Clause 90. The non-transitory computer-readable medium of any of clauses 88 to 89, wherein the one or more parameters that are indeterminable when the request is transmitted are associated with the at least one SL anchor due to mobility of the at least one SL anchor.

Clause 91. The non-transitory computer-readable medium of clause 90, wherein one or more other parameters for at least one stationary anchor are determinable when the request is transmitted due to lack of mobility of the least one stationary anchor.

Clause 92. The non-transitory computer-readable medium of any of clauses 85 to 91, wherein the request specifies the future time via indication of a preferred start time and duration.

Clause 93. The non-transitory computer-readable medium of clause 92, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 94. The non-transitory computer-readable medium of any of clauses 85 to 93, wherein at least one parameter in the first set of parameters is associated with at least one time constraint.

Clause 95. The non-transitory computer-readable medium of clause 94, wherein the at least one time constraint limits when the at least one parameter can be requested, modified, or removed from association with the scheduled on-demand PRS positioning session.

Clause 96. The non-transitory computer-readable medium of any of clauses 85 to 95, wherein the PRS configuration is required to be received within a designated time window.

Clause 97. The non-transitory computer-readable medium of any of clauses 85 to 96, wherein the PRS configuration is received via a plurality of partial PRS configurations that cumulatively define each of the first set of parameters for the scheduled on-demand PRS positioning session.

Clause 98. The non-transitory computer-readable medium of any of clauses 85 to 97, wherein one or more requests for the PRS configuration and one or more responses carrying the PRS configuration include an identifier that is configured to distinguish the scheduled on-demand PRS positioning session from one or more other scheduled on-demand PRS positioning sessions.

Clause 99. A non-transitory computer-readable medium storing computer-executable instructions that, when executed by a position estimation entity, cause the position estimation entity to: receive a request to schedule an on-demand positioning reference signal (PRS) positioning session of a user equipment (UE) at a future time, wherein the request is configured to request a first set of parameters for the scheduled on-demand PRS positioning session, with an availability of one or more parameters of the first set of parameters at the future time being indeterminable when the request is received; determine, in response to the request and in advance of the future time, the availability of the one or more parameters at the future time; determine a PRS configuration for the scheduled on-demand PRS positioning session, wherein the PRS configuration includes a second set of parameters that is based at least in part on the determination of the availability of the one or more parameters at the future time; and transmit, in response to the request and in advance of the future time, the PRS configuration to the UE.

Clause 100. The non-transitory computer-readable medium of clause 99, wherein the PRS configuration comprises a downlink (DL) PRS configuration, an uplink (UL) PRS configuration, a sidelink (SL) PRS configuration, or a combination thereof.

Clause 101. The non-transitory computer-readable medium of any of clauses 99 to 100, wherein the request designates whether a respective parameter is mandatory or optional for each parameter in the first set of parameters.

Clause 102. The non-transitory computer-readable medium of any of clauses 99 to 101, wherein the first set of parameters includes at least one sidelink (SL) anchor.

Clause 103. The non-transitory computer-readable medium of clause 102, wherein the first set of parameters includes, for the at least one SL anchor, an SL beam direction, an SL bandwidth or bandwidth part (BWP), a synchronization signal block (SSB) configuration, or a combination thereof.

Clause 104. The non-transitory computer-readable medium of any of clauses 102 to 103, wherein the one or more parameters that are indeterminable when the request is transmitted are associated with the at least one SL anchor due to mobility of the at least one SL anchor.

Clause 105. The non-transitory computer-readable medium of clause 104, wherein one or more other parameters for at least one stationary anchor are determinable when the request is transmitted due to lack of mobility of the least one stationary anchor.

Clause 106. The non-transitory computer-readable medium of any of clauses 99 to 105, wherein the request specifies the future time via indication of a preferred start time and duration.

Clause 107. The non-transitory computer-readable medium of clause 106, wherein the preferred start time and duration are specified via a set of slots, sub-frames or frames, or wherein the preferred start time and duration are specified in absolute time, or wherein the preferred start time and duration is specified via reference to a future measurement gap or PRS occasion of a current PRS configuration.

Clause 108. The non-transitory computer-readable medium of any of clauses 99 to 107, wherein at least one parameter in the first set of parameters is associated with at least one time constraint.

Clause 109. The non-transitory computer-readable medium of clause 108, wherein the at least one time constraint limits when the at least one parameter can be requested, modified, or removed from association with the scheduled on-demand PRS positioning session.

Clause 110. The non-transitory computer-readable medium of any of clauses 99 to 109, wherein the PRS configuration is required to be received within a designated time window.

Clause 111. The non-transitory computer-readable medium of any of clauses 99 to 110, wherein the PRS configuration is transmitted via a plurality of partial PRS configurations that cumulatively define each of the first set of parameters for the scheduled on-demand PRS positioning session.

Clause 112. The non-transitory computer-readable medium of any of clauses 99 to 111, wherein one or more requests for the PRS configuration and one or more responses carrying the PRS configuration include an identifier that is configured to distinguish the scheduled on-demand PRS positioning session from one or more other scheduled on-demand PRS positioning sessions.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating a network component, comprising:
   receiving, from a position estimation entity, a positioning reference signal (PRS) configuration for a scheduled on-demand PRS positioning session of a user equipment (UE) associated with a request,
   wherein the request is configured to request the scheduled on-demand PRS positioning session of the UE at a future time,
   wherein the request is configured to request a first set of parameters for the scheduled on-demand PRS positioning session, with an availability of one or more parameters of the first set of parameters at the future time being indeterminable when the request is communicated,
   wherein the PRS configuration is received in advance of the future time, and
   wherein the PRS configuration includes a second set of parameters that is based at least in part on the availability of the one or more parameters at the future time; and
   performing one or more PRS-related actions associated with the scheduled on-demand PRS positioning session based on the PRS configuration.

2. The method of claim 1, wherein the one or more PRS-related actions comprise transmission of one or more downlink (DL) PRS, measurement of one or more uplink (UL) PRS, or a combination thereof.

3. The method of claim 1, further comprising:
   receiving, from the UE, the request; and
   forwarding the request to the position estimation entity.

4. The method of claim 1, wherein the PRS configuration comprises a downlink (DL) PRS configuration, an uplink (UL) PRS configuration, a sidelink (SL) PRS configuration, or a combination thereof.

5. The method of claim 1, wherein the request designates whether a respective parameter is mandatory or optional for each parameter in the first set of parameters.

6. The method of claim 1, wherein the first set of parameters includes at least one sidelink (SL) anchor.

7. The method of claim 6, wherein the first set of parameters includes, for the at least one SL anchor, an SL beam direction, an SL bandwidth or bandwidth part (BWP), a synchronization signal block (SSB) configuration, or a combination thereof.

8. The method of claim 6, wherein the one or more parameters that are indeterminable when the request is communicated are associated with the at least one SL anchor due to mobility of the at least one SL anchor.

9. The method of claim 8, wherein one or more other parameters for at least one stationary anchor are determinable when the request is communicated due to lack of mobility of the least one stationary anchor.

10. The method of claim 1, wherein the request specifies the future time via indication of a preferred start time and duration.

11. The method of claim 10,
   wherein the preferred start time and duration are specified via a set of slots, sub-frames or frames, or
   wherein the preferred start time and duration are specified in absolute time, or
   wherein the preferred start time and duration is specified via reference to a future measurement gap or PRS occasion of a current PRS configuration.

12. The method of claim 1, wherein at least one parameter in the first set of parameters is associated with at least one time constraint.

13. The method of claim 12, wherein the at least one time constraint limits when the at least one parameter can be requested, modified, or removed from association with the scheduled on-demand PRS positioning session.

14. The method of claim 1, wherein the PRS configuration is required to be received within a designated time window.

15. The method of claim 1, wherein the PRS configuration is received via a plurality of partial PRS configurations that cumulatively define each of the first set of parameters for the scheduled on-demand PRS positioning session.

16. The method of claim 1, wherein one or more requests for the PRS configuration and one or more responses carrying the PRS configuration include an identifier that is configured to distinguish the scheduled on-demand PRS positioning session from one or more other scheduled on-demand PRS positioning sessions.

17. The method of claim 1, wherein the position estimation entity comprises a location management function (LMF).

18. A network component, comprising:
a memory;
at least one transceiver; and
at least one processor communicatively coupled to the memory and the at least one transceiver, the at least one processor configured to:
receive, via the at least one transceiver, from a position estimation entity, a positioning reference signal (PRS) configuration for a scheduled on-demand PRS positioning session of a user equipment (UE) associated with a request,
wherein the request is configured to request the scheduled on-demand PRS positioning session of the UE at a future time,
wherein the request is configured to request a first set of parameters for the scheduled on-demand PRS positioning session, with an availability of one or more parameters of the first set of parameters at the future time being indeterminable when the request is communicated,
wherein the PRS configuration is received in advance of the future time, and
wherein the PRS configuration includes a second set of parameters that is based at least in part on the availability of the one or more parameters at the future time; and
perform one or more PRS-related actions associated with the scheduled on-demand PRS positioning session based on the PRS configuration.

19. The network component of claim 18, wherein the one or more PRS-related actions comprise transmission of one or more downlink (DL) PRS, measurement of one or more uplink (UL) PRS, or a combination thereof.

20. The network component of claim 18, wherein the at least one processor is further configured to:
receive, via the at least one transceiver, from the UE, the request; and
forward the request to the position estimation entity.

21. The network component of claim 18, wherein the PRS configuration comprises a downlink (DL) PRS configuration, an uplink (UL) PRS configuration, a sidelink (SL) PRS configuration, or a combination thereof.

22. The network component of claim 18, wherein the request designates whether a respective parameter is mandatory or optional for each parameter in the first set of parameters.

23. The network component of claim 18, wherein the first set of parameters includes at least one sidelink (SL) anchor.

24. The network component of claim 23, wherein the first set of parameters includes, for the at least one SL anchor, an SL beam direction, an SL bandwidth or bandwidth part (BWP), a synchronization signal block (SSB) configuration, or a combination thereof.

25. The network component of claim 23, wherein the one or more parameters that are indeterminable when the request is communicated are associated with the at least one SL anchor due to mobility of the at least one SL anchor.

26. The network component of claim 25, wherein one or more other parameters for at least one stationary anchor are determinable when the request is communicated due to lack of mobility of the least one stationary anchor.

27. The network component of claim 18, wherein the request specifies the future time via indication of a preferred start time and duration.

28. The network component of claim 27,
wherein the preferred start time and duration are specified via a set of slots, sub-frames or frames, or
wherein the preferred start time and duration are specified in absolute time, or
wherein the preferred start time and duration is specified via reference to a future measurement gap or PRS occasion of a current PRS configuration.

29. The network component of claim 18, wherein at least one parameter in the first set of parameters is associated with at least one time constraint.

30. The network component of claim 29, wherein the at least one time constraint limits when the at least one parameter can be requested, modified, or removed from association with the scheduled on-demand PRS positioning session.

31. The network component of claim 18, wherein the PRS configuration is required to be received within a designated time window.

32. The network component of claim 18, wherein the PRS configuration is received via a plurality of partial PRS configurations that cumulatively define each of the first set of parameters for the scheduled on-demand PRS positioning session.

33. The network component of claim 18, wherein one or more requests for the PRS configuration and one or more responses carrying the PRS configuration include an identifier that is configured to distinguish the scheduled on-demand PRS positioning session from one or more other scheduled on-demand PRS positioning sessions.

34. The network component of claim 18, wherein the position estimation entity comprises a location management function (LMF).

35. A network component, comprising:
means for receiving, from a position estimation entity, a positioning reference signal (PRS) configuration for a scheduled on-demand PRS positioning session of a user equipment (UE) associated with a request,
wherein the request is configured to request the scheduled on-demand PRS positioning session of the UE at a future time,
wherein the request is configured to request a first set of parameters for the scheduled on-demand PRS positioning session, with an availability of one or more parameters of the first set of parameters at the future time being indeterminable when the request is communicated,
wherein the PRS configuration is received in advance of the future time, and
wherein the PRS configuration includes a second set of parameters that is based at least in part on the availability of the one or more parameters at the future time; and
means for performing one or more PRS-related actions associated with the scheduled on-demand PRS positioning session based on the PRS configuration.

36. The network component of claim 35, wherein the one or more PRS-related actions comprise transmission of one or more downlink (DL) PRS, measurement of one or more uplink (UL) PRS, or a combination thereof.

37. The network component of claim 35, further comprising:
means for receiving, from the UE, the request; and
means for forwarding the request to the position estimation entity.

38. The network component of claim 35, wherein the PRS configuration comprises a downlink (DL) PRS configuration, an uplink (UL) PRS configuration, a sidelink (SL) PRS configuration, or a combination thereof.

39. The network component of claim 35, wherein the request designates whether a respective parameter is mandatory or optional for each parameter in the first set of parameters.

40. The network component of claim 35, wherein the first set of parameters includes at least one sidelink (SL) anchor.

41. The network component of claim 40, wherein the first set of parameters includes, for the at least one SL anchor, an SL beam direction, an SL bandwidth or bandwidth part (BWP), a synchronization signal block (SSB) configuration, or a combination thereof.

42. The network component of claim 40, wherein the one or more parameters that are indeterminable when the request is communicated are associated with the at least one SL anchor due to mobility of the at least one SL anchor.

43. The network component of claim 42, wherein one or more other parameters for at least one stationary anchor are determinable when the request is communicated due to lack of mobility of the least one stationary anchor.

44. The network component of claim 35, wherein the request specifies the future time via indication of a preferred start time and duration.

45. The network component of claim 44,
wherein the preferred start time and duration are specified via a set of slots, sub-frames or frames, or
wherein the preferred start time and duration are specified in absolute time, or
wherein the preferred start time and duration is specified via reference to a future measurement gap or PRS occasion of a current PRS configuration.

46. The network component of claim 35, wherein at least one parameter in the first set of parameters is associated with at least one time constraint.

47. The network component of claim 46, wherein the at least one time constraint limits when the at least one parameter can be requested, modified, or removed from association with the scheduled on-demand PRS positioning session.

48. The network component of claim 35, wherein the PRS configuration is required to be received within a designated time window.

49. The network component of claim 35, wherein the PRS configuration is received via a plurality of partial PRS configurations that cumulatively define each of the first set of parameters for the scheduled on-demand PRS positioning session.

50. The network component of claim 35, wherein one or more requests for the PRS configuration and one or more responses carrying the PRS configuration include an identifier that is configured to distinguish the scheduled on-demand PRS positioning session from one or more other scheduled on-demand PRS positioning sessions.

51. The network component of claim 35, wherein the position estimation entity comprises a location management function (LMF).

52. A non-transitory computer-readable medium storing computer-executable instructions that, when executed by a network component, cause the network component to:
receive, from a position estimation entity, a positioning reference signal (PRS) configuration for a scheduled on-demand PRS positioning session of a user equipment (UE) associated with a request,
wherein the request is configured to request the scheduled on-demand PRS positioning session of the UE at a future time,
wherein the request is configured to request a first set of parameters for the scheduled on-demand PRS positioning session, with an availability of one or more parameters of the first set of parameters at the future time being indeterminable when the request is communicated,
wherein the PRS configuration is received in advance of the future time, and
wherein the PRS configuration includes a second set of parameters that is based at least in part on the availability of the one or more parameters at the future time; and
perform one or more PRS-related actions associated with the scheduled on-demand PRS positioning session based on the PRS configuration.

53. The non-transitory computer-readable medium of claim 52, wherein the one or more PRS-related actions comprise transmission of one or more downlink (DL) PRS, measurement of one or more uplink (UL) PRS, or a combination thereof.

54. The non-transitory computer-readable medium of claim 52, further comprising computer-executable instructions that, when executed by the network component, cause the network component to:
receive, from the UE, the request; and
forward the request to the position estimation entity.

55. The non-transitory computer-readable medium of claim 52, wherein the PRS configuration comprises a downlink (DL) PRS configuration, an uplink (UL) PRS configuration, a sidelink (SL) PRS configuration, or a combination thereof.

56. The non-transitory computer-readable medium of claim 52, wherein the request designates whether a respective parameter is mandatory or optional for each parameter in the first set of parameters.

57. The non-transitory computer-readable medium of claim 52, wherein the first set of parameters includes at least one sidelink (SL) anchor.

58. The non-transitory computer-readable medium of claim 57, wherein the first set of parameters includes, for the at least one SL anchor, an SL beam direction, an SL bandwidth or bandwidth part (BWP), a synchronization signal block (SSB) configuration, or a combination thereof.

59. The non-transitory computer-readable medium of claim 57, wherein the one or more parameters that are indeterminable when the request is communicated are associated with the at least one SL anchor due to mobility of the at least one SL anchor.

60. The non-transitory computer-readable medium of claim 59, wherein one or more other parameters for at least one stationary anchor are determinable when the request is communicated due to lack of mobility of the least one stationary anchor.

61. The non-transitory computer-readable medium of claim 52, wherein the request specifies the future time via indication of a preferred start time and duration.

62. The non-transitory computer-readable medium of claim 61,
wherein the preferred start time and duration are specified via a set of slots, sub-frames or frames, or
wherein the preferred start time and duration are specified in absolute time, or
wherein the preferred start time and duration is specified via reference to a future measurement gap or PRS occasion of a current PRS configuration.

63. The non-transitory computer-readable medium of claim 52, wherein at least one parameter in the first set of parameters is associated with at least one time constraint.

64. The non-transitory computer-readable medium of claim 63, wherein the at least one time constraint limits when the at least one parameter can be requested, modified, or removed from association with the scheduled on-demand PRS positioning session.

65. The non-transitory computer-readable medium of claim 52, wherein the PRS configuration is required to be received within a designated time window.

66. The non-transitory computer-readable medium of claim 52, wherein the PRS configuration is received via a plurality of partial PRS configurations that cumulatively define each of the first set of parameters for the scheduled on-demand PRS positioning session.

67. The non-transitory computer-readable medium of claim 52, wherein one or more requests for the PRS configuration and one or more responses carrying the PRS configuration include an identifier that is configured to distinguish the scheduled on-demand PRS positioning session from one or more other scheduled on-demand PRS positioning sessions.

68. The non-transitory computer-readable medium of claim 52, wherein the position estimation entity comprises a location management function (LMF).

* * * * *